(12) United States Patent
Ahn et al.

(10) Patent No.: US 8,861,467 B2
(45) Date of Patent: Oct. 14, 2014

(54) METHOD AND DEVICE FOR TRANSMITTING SOUNDING REFERENCE SIGNAL AND EXTENDED UPLINK CONTROL INFORMATION IN WIRELESS COMMUNICATION SYSTEM

(75) Inventors: Joonkui Ahn, Anyang-si (KR); Suckchel Yang, Anyang-si (KR); Mingyu Kim, Anyang-si (KR); Dongyoun Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 109 days.

(21) Appl. No.: 13/581,239

(22) PCT Filed: Jul. 26, 2011

(86) PCT No.: PCT/KR2011/005499
§ 371 (c)(1),
(2), (4) Date: Aug. 24, 2012

(87) PCT Pub. No.: WO2012/015218
PCT Pub. Date: Feb. 2, 2012

(65) Prior Publication Data
US 2012/0320859 A1 Dec. 20, 2012

Related U.S. Application Data

(60) Provisional application No. 61/367,839, filed on Jul. 26, 2010.

(51) Int. Cl.
*H04W 4/00* (2009.01)
*H04L 5/00* (2006.01)
*H04L 1/18* (2006.01)
*H04L 1/16* (2006.01)

(52) U.S. Cl.
CPC ............ *H04L 5/0053* (2013.01); *H04L 5/0048* (2013.01); *H04L 1/1861* (2013.01); *H04L 1/1607* (2013.01)
USPC ............ 370/329; 370/458; 370/345; 370/442

(58) Field of Classification Search
None
See application file for complete search history.

(56) References Cited

U.S. PATENT DOCUMENTS 7,952,991 B2   5/2011  Kim et al.
8,150,327 B2 *  4/2012  McCoy et al. ............. 455/67.11
(Continued)

FOREIGN PATENT DOCUMENTS

JP       2010-518776 A    5/2010
WO    WO 2008/100076 A    8/2008

*Primary Examiner* — Kibrom T Hailu
(74) *Attorney, Agent, or Firm* — Birch, Stewart, Kolasch & Birch, LLP

(57) ABSTRACT

The present invention relates to a wireless communication system, and more particularly, discloses a method and a device for transmitting a sounding reference signal and extended uplink control information in a wireless communication system. A method for a terminal transmitting the uplink control information through a physical uplink control channel in the wireless communication system, according to one embodiment of the present invention, comprises the following steps: creating a block by multiplying a modulation symbol, which shows the uplink control information, to a circular shift sequence, and creating a $N_{SF}$ blocks for each of the two slots of an uplink subframe; block-wise spreading the $N_{SF}$ blocks using an orthogonal code; and mapping a $N_{RS}$ reference signals and the block-wise spread $N_{SF}$ blocks to each of the two lots of the uplink subframe, and transmitting same to a base station, wherein the $N_{SF}$ blocks transmitted from the second slot of the uplink subframe can have an equal value when the transmission of the sounding reference signal is set and when the transmission of the sounding reference signal is not set in the uplink subframe.

14 Claims, 16 Drawing Sheets

(56) References Cited

U.S. PATENT DOCUMENTS

| | | | |
|---|---|---|---|
| 8,451,778 B2* | 5/2013 | Chung et al. | 370/328 |
| 2005/0190728 A1 | 9/2005 | Han et al. | |
| 2005/0232138 A1 | 10/2005 | Byun et al. | |
| 2006/0013185 A1 | 1/2006 | Seo et al. | |
| 2012/0002568 A1* | 1/2012 | Tiirola et al. | 370/252 |

* cited by examiner (a)

(b)

METHOD AND DEVICE FOR TRANSMITTING SOUNDING REFERENCE SIGNAL AND EXTENDED UPLINK CONTROL INFORMATION IN WIRELESS COMMUNICATION SYSTEM

CROSS REFERENCE TO RELATED APPLICATIONS

This application is the National Phase of PCT/KR2011/005499 filed on Jul. 26, 2011, which claims priority under 35 U.S.C. 119(e) to U.S. Provisional Application No. 61/367,839 filed on Jul. 26, 2010, all of which are hereby expressly incorporated by reference into the present application.

TECHNICAL FIELD

The present invention relates to a wireless communication system, and more particularly, to a method of transmitting a sounding reference signal and an extended uplink control information in a wireless communication system and apparatus for the same.

BACKGROUND ART

Uplink control information may consist of scheduling request, acknowledgement/non-acknowledgement (ACK/NACK) for a downlink (DL) transmission, a downlink channel state information and the like. In this case, ACK/NACK information on the DL transmission is control information fed back to a DL transmission entity by a DL reception entity in accordance with whether decoding of DL data is successful. In particular, if the DL reception entity successfully completes the decoding of the DL data, it may feed back the ACK information to the DL transmission entity. Otherwise, the DL reception entity may feed back the NACK information to the DL transmission entity.

Meanwhile, in order to support a bandwidth extended more than that of a related art, introduction of multiple carrier technology is taken into consideration. The multiple carrier technology may be called carrier aggregation technology. This carrier aggregation is the technology of brining an effect of using a logically wide frequency bandwidth by binding multiple carriers together in a frequency domain, whereas a single carrier is used by a general wireless communication system of a related art. If the multiple carrier technology is applied to a DL transmission, a plurality of DL data can be transmitted via a plurality of data channels on a plurality of DL carriers (or DL cells) at a specific time. Hence, a DL reception entity may be requested to feed back a plurality of ACK/NACK informations on a plurality of the DL data to a DL transmission entity.

Moreover, in TDD (time division duplex) system having a DL transceiving and a UL transceiving performed in different times (e.g., subframes), a plurality of ACK/NACK informations on a plurality of DL data transmitted in a plurality of DL subframes may be requested to be fed back.

Meanwhile, in order for a base station to measure a quality of an uplink (UL) channel from a user equipment, a signal (e.g., a reference signal (RS)) known to both of the base station and the user equipment may be available. For instance, a sounding reference signal (SRS) is periodically transmitted to a base station by a user equipment. Having receives the sounding reference signals from user equipments, the base station measures a UL channel, allocates a UL resource to each of the user equipments, and may then able to inform the corresponding user equipment of the result of the UL resource allocation.

DISCLOSURE OF THE INVENTION

Technical Task

In a related art wireless communication system, when UL ACK/NACK information is transmitted on a physical uplink control channel, it is defined to transmit 1- or 2-bit ACK/NACK information only. Hence, as mentioned in the foregoing description, in order to transmit ACK/NACK information on a plurality of DL data in multi-carrier or TDD system, it may be necessary to define ACK/NACK transmission resource to use more bits for ACK/NACK information transmission. This may be called an extended ACK/NACK information transmission scheme.

Moreover, SRS may be transmitted together in a UL subframe for carrying the extended ACK/NACK information. In doing so, a partial time unit (e.g., last SC-FDMA symbol or OFDM symbol of one UL subframe) of a UL subframe available for a transmission of the extended ACK/NACK information may be used for a transmission of the SRS. Therefore, it may be necessary to define an extended ACK/NACK information transmitting scheme in consideration of a case that SRS and extended UL control information are transmitted in a same UL subframe.

The technical task of the present invention is to provide a method and apparatus for transmitting UL control information efficiently and accurately in a manner of defining a scheme of transmitting extended UL control information in consideration of a case that SRS and extended ACK/NACK information are transmitted in a same UL subframe.

Technical tasks obtainable from the present invention are non-limited the above-mentioned technical task. And, other unmentioned technical tasks can be clearly understood from the following description by those having ordinary skill in the technical field to which the present invention pertains.

Technical Solutions

To achieve these and other advantages and in accordance with the purpose of the present invention, as embodied and broadly described, a method of transmitting an uplink (UL) control information, which is transmitted via a physical uplink control channel (PUCCH) by a user equipment in a wireless communication system, according to one embodiment of the present invention may include the steps of generating $N_{SF}$ blocks for each of 2 slots of a UL subframe in a manner of generating each of the $N_{SF}$ blocks by multiplying a modulated symbol indicating the UL control information by a cyclic-shifted sequence, block-wise spreading the $N_{SF}$ blocks using orthogonal code, and transmitting $N_{RS}$ reference signals (RSs) and the $N_{SF}$ block-wide spread blocks to a base station in a manner of mapping the $N_{RS}$ reference signals (RSs) and the $N_{SF}$ block-wide spread blocks to the 2 slots of the UL subframe, respectively, wherein the number $N_{SF}$ of the blocks transmitted in the $2^{nd}$ slot of the UL subframe has a same value for a case of configuring a transmission of SRS (sounding reference signal) in the UL subframe and a case of not configuring the transmission of the SRS.

To further achieve these and other advantages and in accordance with the purpose of the present invention, a method of receiving an uplink (UL) control information, which is received via a physical uplink control channel (PUCCH) by a base station in a wireless communication system, according to another embodiment of the present invention may include the step of receiving $N_{RS}$ reference signals (RSs) and $N_{SF}$ block-wide spread blocks, which are mapped to 2 slots of a UL subframe, respectively, from a user equipment, wherein the $N_{SF}$ block-wide spread blocks are generated by the user equipment in a manner of generating one block by multiplying a modulated symbol indicating the UL control information by a cyclic-shifted sequence, generating $N_{SF}$ blocks for each of the 2 slots of the UL subframe, and then block-wise spreading the $N_{SF}$ blocks using orthogonal code and wherein the number $N_{SF}$ of the blocks transmitted in the $2^{nd}$ slot of the UL subframe has a same value for a case of configuring a transmission of SRS (sounding reference signal) in the UL subframe and a case of not configuring the transmission of the SRS.

To further achieve these and other advantages and in accordance with the purpose of the present invention, a user equipment, which transmits an uplink (UL) control information via a physical uplink control channel (PUCCH) in a wireless communication system, according to another embodiment of the present invention may include a transmitting module transmitting an uplink (UL) signal to a base station, a receiving module receiving a downlink (DL) signal from the base station, and a processor controlling the user equipment including the receiving module and the transmitting module, the processor configured to generate $N_{SF}$ blocks for each of 2 slots of a UL subframe in a manner of generating each of the $N_{SF}$ blocks by multiplying a modulated symbol indicating the UL control information by a cyclic-shifted sequence, the processor configured to block-wise spread the $N_{SF}$ blocks using orthogonal code, the processor configured to transmit $N_{RS}$ reference signals (RSs) and the $N_{SF}$ block-wide spread blocks to the base station via the transmitting module in a manner of mapping the $N_{RS}$ reference signals (RSs) and the $N_{SF}$ block-wide spread blocks to the 2 slots of the UL subframe, respectively, wherein the number $N_{SF}$ of the blocks transmitted in the $2^{nd}$ slot of the UL subframe has a same value for a case of configuring a transmission of SRS (sounding reference signal) in the UL subframe and a case of not configuring the transmission of the SRS.

To further achieve these and other advantages and in accordance with the purpose of the present invention, a base station, which receives an uplink (UL) control information via a physical uplink control channel (PUCCH) in a wireless communication system, according to a further embodiment of the present invention may include a transmitting module transmitting a downlink signal to at least one user equipment, a receiving module receiving an uplink signal from the at least one user equipment, and a processor controlling the base station including the receiving module and the transmitting module, the processor configured to receive $N_{RS}$ reference signals (RSs) and $N_{SF}$ block-wide spread blocks, which are mapped to 2 slots of a UL subframe, respectively, from the user equipment, wherein the $N_{SF}$ block-wide spread blocks are generated by the user equipment in a manner of generating one block by multiplying a modulated symbol indicating the UL control information by a cyclic-shifted sequence, generating $N_{SF}$ blocks for each of the 2 slots of the UL subframe, and then block-wise spreading the $N_{SF}$ blocks using orthogonal code and wherein the number $N_{SF}$ of the blocks transmitted in the $2^{nd}$ slot of the UL subframe has a same value for a case of configuring a transmission of SRS (sounding reference signal) in the UL subframe and a case of not configuring the transmission of the SRS.

The following matters may be applicable in common to the above-mentioned embodiments of the present invention.

Preferably, the UL control information may include HARQ (hybrid automatic repeat request) ACK/NACK information transmitted using one of PUCCH format 1, PUCCH format 1a and PUCCH format 1b and the number $N_{SF}$ of the blocks transmitted in the $2^{nd}$ slot of the UL subframe may be set to 4 for each of the UL subframe of a normal cyclic prefix (CP) and the UL subframe of an extended cyclic prefix (CP).

Preferably, the number $N_{RS}$ of the reference signals transmitted in the $2^{nd}$ slot of the UL subframe in the case of configuring the transmission of the SRS (sounding reference signal) in the UL subframe may not be equal to the number $N_{RS}$ of the reference signals transmitted in the $2^{nd}$ slot of the UL subframe in the case of not configuring the transmission of the SRS.

Preferably, the UL control information may include HARQ (hybrid automatic repeat request) ACK/NACK information transmitted using one of PUCCH format 1, PUCCH format 1a and PUCCH format 1b, the number $N_{RS}$ of the reference signals transmitted in the $2^{nd}$ slot of the UL subframe may be 2 in the case of configuring the transmission of the SRS (sounding reference signal) in the UL subframe of a normal cyclic prefix (CP) or 3 in the case of not configuring the transmission of the SRS, and the number $N_{RS}$ of the reference signals transmitted in the $2^{nd}$ slot of the UL subframe may be 1 in the case of configuring the transmission of the SRS (sounding reference signal) in the UL subframe of an extended cyclic prefix (CP) or 2 in the case of not configuring the transmission of the SRS.

Preferably, the sequence may be cyclic-shifted in accordance with a different cyclic shift value for each of a plurality of SC-FDMA (single carrier frequency division multiple access) symbols of each of the 2 slots of the UL subframe for transmitting the UL control information.

Preferably, a plurality of PUCCH transmission resources may be allocated to the user equipment and at least one of a resource block (RB), an orthogonal code (OC) and a cyclic shift (CS) may be differently allocated to each of a plurality of the PUCCH transmission resources.

The above-mentioned general description of the present invention and the following details of the present invention are exemplary and may be provided for the additional description of the invention disclosed in claims.

Advantageous Effects

Accordingly, the present invention defines a scheme of transmitting an extended UL control information in consideration of a case that SRS and extended ACK/NACK information are transmitted in a same UL subframe, thereby providing a method and apparatus for transmitting UL control information efficiently and accurately.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

BEST MODE FOR INVENTION

Figure 1:
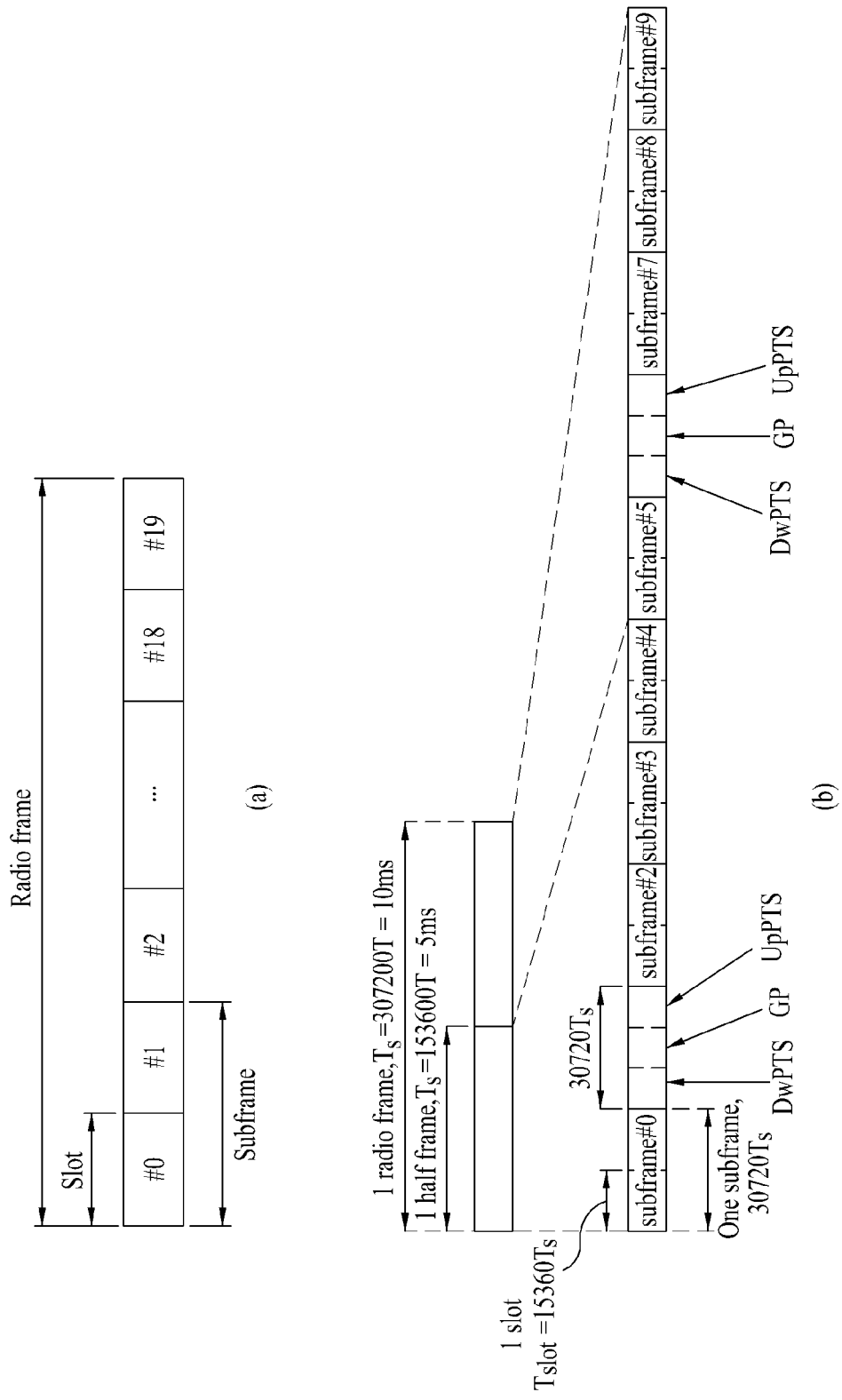
FIG. 1 is a diagram for a structure of a radio frame.

First of all, the following embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, an embodiment of the present invention may be implemented by combining elements and/or features together in part. A sequence of operations explained for each embodiment of the present invention may be modifiable. Some configurations or features of one embodiment may be included in another embodiment or substituted with corresponding configurations or features of another embodiment.

In this specification, embodiments of the present invention are described centering on the data transmission/reception relations between a base station and a terminal. In this case, the base station may be meaningful as a terminal node of a network which directly performs communication with the terminal. In this disclosure, a specific operation explained as performed by a base station may be performed by an upper node of the base station in some cases. In particular, in a network constructed with a plurality of network nodes including a base station, it is apparent that various operations performed for communication with a terminal can be performed by a base station or other networks except the base station.

Moreover, in this document, 'base station (BS)' may be substituted with such a terminology as a fixed station, a Node B, an eNode B (eNB), an access point (AP) and the like. A relay may be substituted with such a terminology as a relay node (RN), a relay station (RS) and the like. And, 'terminal' may be substituted with such a terminology as a user equipment (UE), a mobile station (MS), a mobile subscriber station (MSS), a subscriber station (SS) and the like.

Specific terminologies used for the following description may be provided to help the understanding of the present invention. And, the use of the specific terminology may be modified into other forms within the scope of the technical idea of the present invention.

Occasionally, to prevent the present invention from getting vaguer, structures and/or devices known to the public may be skipped or represented as block diagrams centering on the core functions of the structures and/or devices. Wherever possible, the same reference numbers will be used throughout the drawings to refer to the same or like parts in this specification.

Embodiments of the present invention may be supported by the disclosed standard documents of at least one of wireless access systems including IEEE 802 system, 3GPP system, 3GPP LTE and LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

The following description of embodiments of the present invention may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE adopts OFDMA in downlink (hereinafter abbreviated) DL and SC-FDMA in uplink (hereinafter abbreviated UL). And, LTE-A (LTE-Advanced) is an evolved version of 3GPP LTE. WiMAX may be explained by IEEE 802.16e standard (e.g., WirelessMAN-OFDMA reference system) and advanced IEEE 802.16m standard (e.g., WirelessMAN-OFDMA advanced system). For clarity, the following description mainly concerns 3GPP LTE system or 3GPP LTE-A system, by which the technical idea of the present invention may be non-limited.

A structure of a downlink (DL) radio frame is described with reference to FIG. 1 as follows. In a cellular OFDM radio packet communication system, UL/DL (uplink/downlink) data packet transmission is performed by a unit of subframe. And, one subframe is defined as a predetermined time interval including a plurality of OFDM symbols. In the 3GPP LTE standard, a type-1 radio frame structure applicable to FDD (frequency division duplex) and a type-2 radio frame structure applicable to TDD (time division duplex) are supported.

FIG. 1 (a) is a diagram for a structure of a downlink radio frame of type 1. A DL (downlink) radio frame includes 10 subframes. Each of the subframes includes 2 slots. And, a time taken to transmit one subframe is defined as a transmission time interval (hereinafter abbreviated TTI). For instance, one subframe may have a length of 1 ms and one slot may have a length of 0.5 ms. One slot may include a plurality of OFDM symbols in time domain or may include a plurality of resource blocks (RBs) in frequency domain. Since 3GPP system uses OFDMA in downlink, OFDM symbol indicates one symbol duration. The OFDM symbol may be named SC-FDMA symbol or symbol duration. Resource block (RB) is a resource allocation unit and may include a plurality of contiguous subcarriers in one slot.

The number of OFDM symbols included in one slot may vary in accordance with a configuration of CP. The CP may be categorized into an extended CP and a normal CP. For instance, in case that OFDM symbols are configured by the normal CP, the number of OFDM symbols included in one slot may be 7. In case that OFDM symbols are configured by the extended CP, since a length of one OFDM symbol increases, the number of OFDM symbols included in one slot may be smaller than that of the case of the normal CP. In case of the extended CP, for instance, the number of OFDM symbols included in one slot may be 6. If a channel status is unstable (e.g., a UE is moving at high speed), it may be able to use the extended CP to further reduce the inter-symbol interference.

When a normal CP is used, since one slot includes 7 OFDM symbols, one subframe includes 14 OFDM symbols. In this case, first 2 or 3 OFDM symbols of each subframe may be allocated to PDCCH (physical downlink control channel), while the rest of the OFDM symbols are allocated to PDSCH (physical downlink shared channel).

FIG. 1 (*b*) is a diagram for a structure of a downlink radio frame of type 2. A type-2 radio frame includes 2 half frames. Each of the half frame includes 5 subframes, DwPTS (downlink pilot time slot), GP (guard period) and UpPTS (uplink pilot time slot). And, one of the subframes includes 2 slots. The DwPTS is used for initial cell search, synchronization or channel estimation in a user equipment. The UpPTS is used for channel estimation in a base station and uplink transmission synchronization of a user equipment. The guard period is a period for eliminating interference generated in uplink due to multi-path delay of a downlink signal between uplink and downlink.

The above-described structures of the radio frame are just exemplary. And, the number of subframes included in a radio frame, the number of slots included in the subframe and the number of symbols included in the slot may be modified in various ways.

Figure 2:
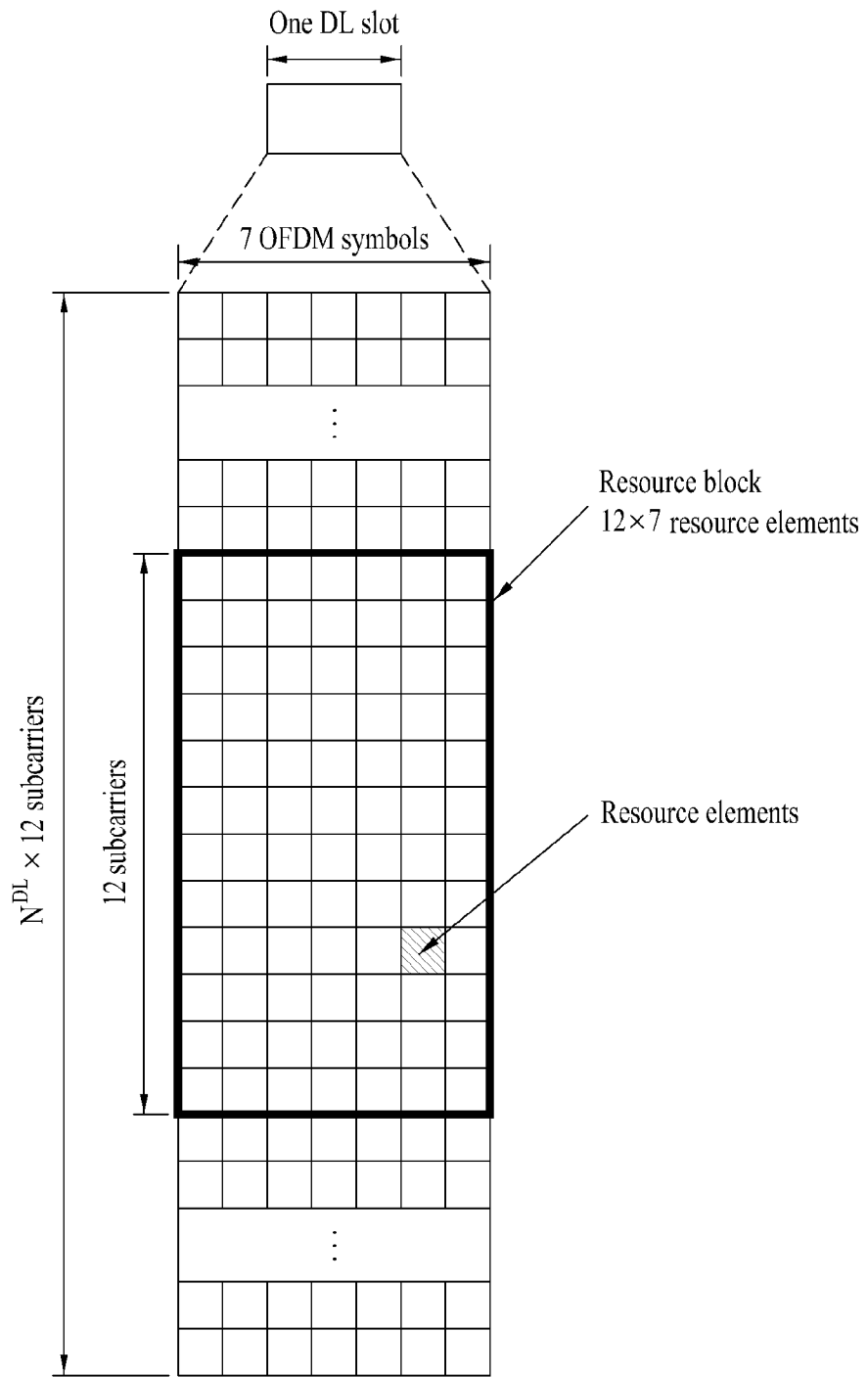
FIG. 2 is a diagram for one example of a resource grid in a downlink slot.

FIG. 2 is a diagram for one example of a resource grid for a downlink (DL) slot. One downlink (DL) slot may include 7 OFDM symbols in time domain and one resource block (RB) may include 12 subcarriers in frequency domain, by which the present invention may be non-limited. For instance, in case of a normal cyclic prefix (CP), one slot includes 7 OFDM symbols. Yet, in case of an extended CP, one slot may include 6 OFDM symbols. Each element on a resource grid may be named a resource element (hereinafter abbreviated RE). One resource block includes 12×7 resource elements. The number $N^{DL}$ of resource blocks included in a DL slot may depend on a DL transmission bandwidth. And, the structure of an uplink (UL) slot may be identical to that of the DL slot.

Figure 3:
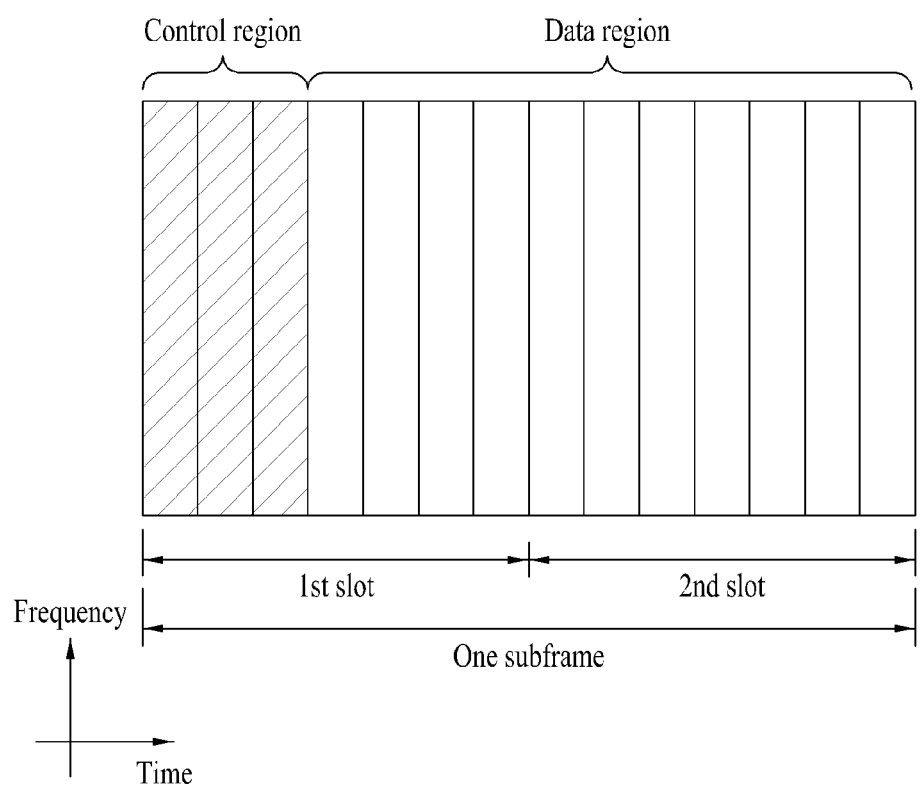
FIG. 3 is a diagram for a structure of a downlink subframe.

FIG. 3 is a diagram for a structure of a downlink (DL) subframe. Maximum 3 OFDM symbols situated in a head part of a first slot of one subframe correspond to a control region to which a control channel is allocated. The rest of OFDM symbols correspond to a data region to which PDSCH (physical downlink shared channel) is allocated. A basic unit of transmission becomes one subframe. In particular, PDCCH and PDSCH are assigned across 2 slots. Examples of DL control channels used by 3GPP LTE system may include PCFICH (Physical Control Format Indicator Channel), PDCCH (Physical Downlink Control Channel), PHICH (Physical hybrid automatic repeat request indicator Channel) and the like. The PCFICH is transmitted in a first OFDM symbol of a subframe and includes information on the number of OFDM symbols used for a transmission of a control channel within the subframe. The PHICH includes HARQ ACK/NACK signal in response to a UL transmission. Control information carried on PDCCH may be called downlink control information (DCI).

The DCI may include UL or DL scheduling information or a UL transmission power control command for a random UE (user equipment) group. The PDCCH may include transmission format and resource allocation information of DL-SCH (downlink shared channel), resource allocation information on UL-SCH (uplink shared channel), paging information on PCH (paging channel), system information on DL-SCH, resource allocation of such a higher layer control message as a random access response transmitted on PDSCH, transmission power control command set for individual UEs within a random UE group, transmission power control information, activation of VoIP (voice over IP) and the like. A plurality of PDCCHs can be transmitted within the control region. A user equipment may be able to monitor a plurality of the PDCCHs. The PDCCH is transmitted as an aggregation of at least one or more contiguous CCEs (control channel elements). The CCE is a logical allocation unit used to provide the PDCCH at a coding rate based on a radio channel status. The CCE may correspond to a plurality of REGs (resource element groups). A format of the PDCCH and the number of available PDCCH bits may be determined in accordance with correlation between the number of CCEs and a coding rate provided by the CCE. A base station determines a PDCCH format in accordance with a DCI which is to be transmitted to a user equipment and attaches a CRC (cyclic redundancy check) to control information. The CRC is masked with an identifier named RNTI (radio network temporary identifier) in accordance with an owner or usage of the PDCCH. For instance, if the PDCCH is provided for a specific user equipment, the CRC may be masked with an identifier (e.g., cell-RNTI (C-RNTI)) of the corresponding user equipment. In case that the PDCCH is provided for a paging message, the CRC may be masked with a paging indicator identifier (e.g., P-RNTI). If the PDCCH is provided for system information (particularly, for a system information block (SIC)), the CRC may be masked with a system information identifier and a system information RNTI (SI-RNTI). In order to indicate a random access response to a transmission of a random access preamble of a user equipment, the CRC may be masked with RA-RNTI (random access-RNTI).

Figure 4:
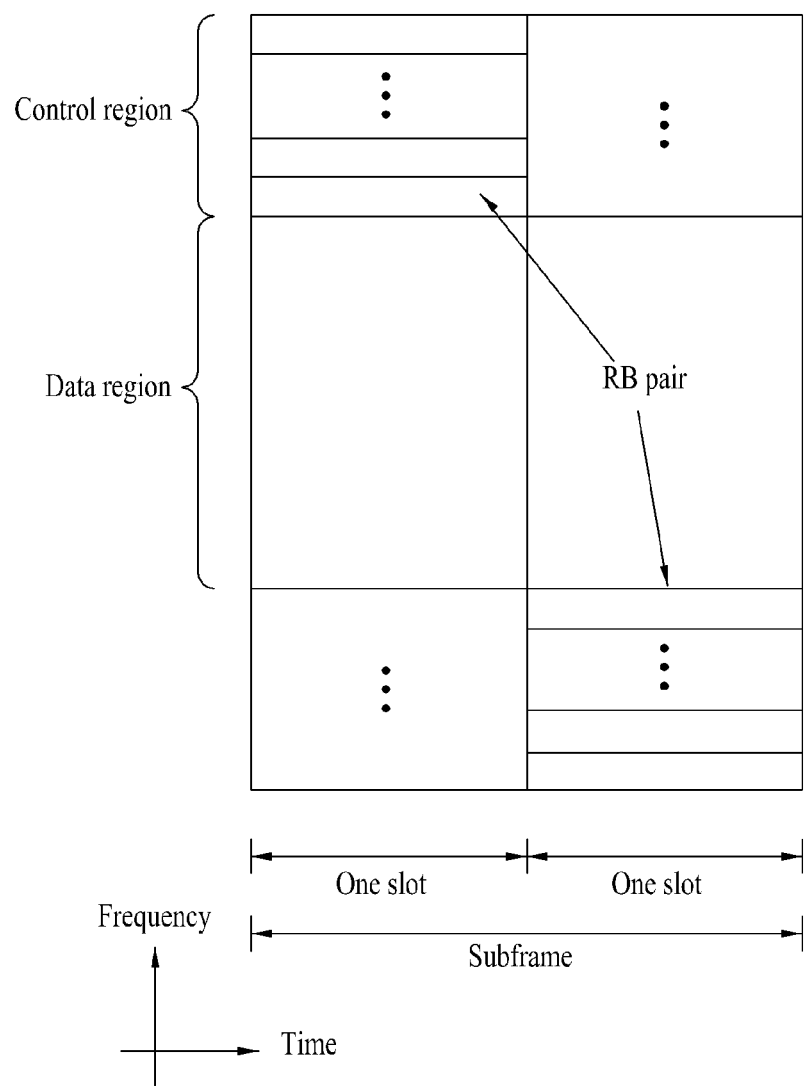
FIG. 4 is a diagram for a structure of an uplink subframe.

FIG. 4 is a diagram for a structure of an uplink (UL) subframe. A UL subframe may be divided into a control region and a data region in frequency domain. A physical UL control channel (PUCCH) including UL control information may be allocated to the control region. And, a physical UL shared channel (PUSCH) including user data may be allocated to the data region. In order to maintain single carrier property, one user equipment does not transmit PUCCH and PUSCH simultaneously. PUCCH for one user equipment may be allocated to a resource block pair (RB pair) in subframe. Resource blocks belonging to the resource block pair may occupy different subcarriers for 2 slots. Namely, a resource block pair allocated to PUCCH is frequency-hopped on a slot boundary.

Carrier Aggregation

An advanced OFDMA based mobile communication system is considering an introduction of carrier aggregation (hereinafter abbreviated CA) technology. And, this CA technology means the technology that can achieve a high data transmission rate in a manner of performing UL/DL transmission using at least one carrier (e.g., component carrier (CC), cell, etc.) individually designated to DL or UL simultaneously. A system having carrier aggregation applied thereto may be represented as a multi-carrier system. In the following description, a UL carrier, which becomes a target of carrier aggregation, may be schematically represented as UL CC or UL cell, while a DL carrier may be schematically represented as DL CC or DL cell. In this case, carriers (cells or CCs) becoming targets of the carrier aggregation may be configured on contiguous or non-contiguous frequency.

Figure 5:
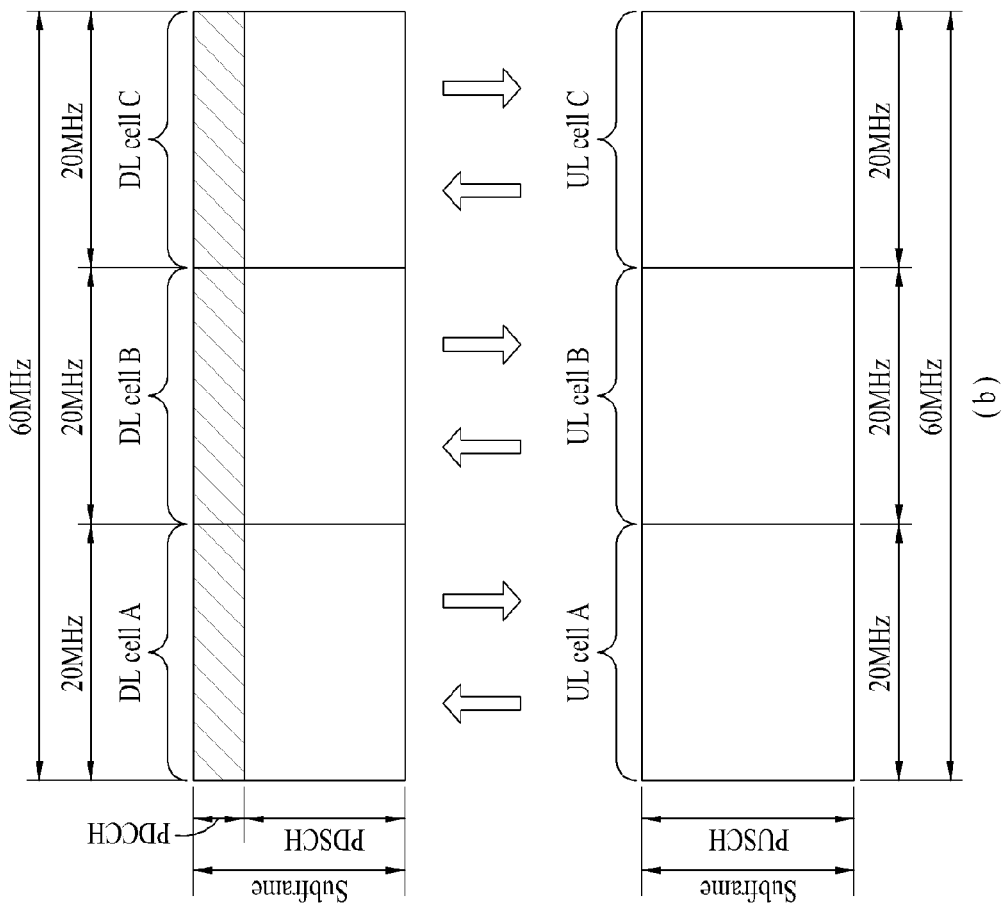
FIG. 5 is a diagram to describe a single carrier system and a multi-carrier system.
Figure 5:
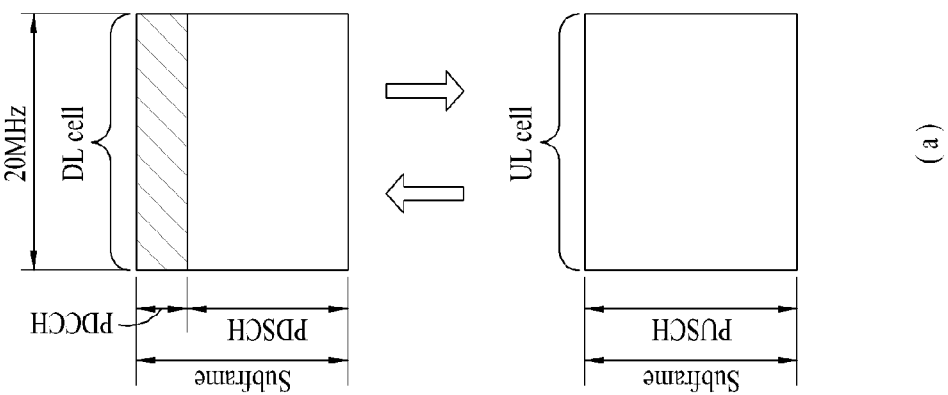

FIG. 5 is a diagram to describe a single carrier system and a multi-carrier system. FIG. 5 (a) shows DL subframe structure and UL subframe structure in a single carrier system of a related art. FIG. 5 (b) shows DL subframe structure and UL subframe structure in a multi-carrier system having 3 component carriers (CC) or cells aggregated together.

Referring to FIG. 5 (b), a user equipment may be able to monitor and receive DL signal/data on a plurality of DL cells. Yet, although a base station manages N DL cells, if a network configures M DL cells (where, M≤N) for a user equipment, a DL signal/data monitoring operation performed by the user equipment may be limited to M DL cells. Moreover, in case that a network configures L DL cell(s) (where, L≤M≤N) as main DL cell(s), a user equipment may be able to preferentially perform monitoring/reception of DL signal/data on the L DL cells. These L DL cell(s) may be represented as DL primary cell (DL P-cell) or DL anchor cell. And, the DL P-cell may be configured UE-specifically or cell-specifically.

Meanwhile, it may be able to configure a UL primary cell (UL P-cell) for transmitting PUCCH to carry UL control information (UCI) supposed to be transmitted in UL by a user equipment. In this case, the UL P-cell may be called a UL anchor cell.

Control Signaling Via Physical Uplink Control Channel (PUCCH)

Physical uplink control channel (PUCCH) is the channel that carries uplink (UP) control channel. Various kinds of PUCCH formats are defined by depending on a type of control information contained in PUCCH, a modulation scheme, a size of the control information and the like. This shall be described in detail as follows.

Control signaling information carried on PUCCH may include scheduling request (SR), HARQ ACK/NACK information and downlink (DL) channel measurement information.

HARQ ACK/NACK information may be generated by depending on whether decoding of UL data packet on PDSCH is successfully completed. In a conventional wireless communication system, 1 bit is transmitted as ACK/NACK information for a DL single codeword transmission or 2 bits are transmitted as ACK/NACK information for a DL 2-codeword transmission.

Channel measurement information means feedback information related to MIMO (multiple input multiple output) scheme and may include a channel quality indicator (CQI), a precoding matrix index IPMI) and a rank indicator (RI). Theses channel measurement information may be commonly represented as CQI. For the transmission of CQI, 20 bits per subframe may be used.

PUCCH may be modulated using BPSK (binary phase shift keying) and QPSK (quadrature phase shift keying). Control information on a plurality of user equipments may be transmitted on PUCCH. When Code Division Multiplexing (CDM) is performed in order to identify signals of a plurality of the user equipments, 12 CAZAC (Constant Amplitude Zero Autocorrelation) sequences are mainly used. Since CAZAC sequence has the property of maintaining a constant amplitude in time domain or frequency domain, the CAZAC sequence is most appropriate for decreasing a PAPR (Peak-to-Average Power Ratio) or CM (Cubic Metric) of a user equipment so as to increase a coverage. And, ACK/NACK information on a transmission of downlink data, which is transmitted on PUCCH, may be covered using an orthogonal sequence.

Control information transmitted on PUCCH may be identified using cyclically shifted sequences including different cyclic shift values. The cyclically shifted sequence may be generated by cyclically shifting a base sequence by a specific CS (cyclic shift) amount. The specific CS amount is indicated by a cyclic shift (CS) index. The number of available cyclic shifts may vary by depending upon a delay spread of a channel. One of sequences of various types may be used as the base sequence. And, the aforementioned CAZAC sequence is one example of those sequences.

A size of control information, which can be transmitted in one subframe by a user equipment, may be determined in accordance with the number of SC-FDMA symbols (i.e., SC-FDMA symbols except SC-FDMA symbol used for a reference signal (RS) transmission for a coherent detection of PUCCH) available for a transmission of the control information.

In 3GPP LTE system, PUCCH is defined by total 7 kinds of different formats in accordance with a transmitted control information, a modulation scheme, a control information size and the like and attributes of uplink control information (UCI) transmitted by each of the PUCCH formats may be summarized as Table 1 below.

TABLE 1

| PUCCH format | Modulation scheme | Number of bits per subframe | Usage | etc. |
| --- | --- | --- | --- | --- |
| 1 | N/A | N/A | SR(Scheduling Request) | |
| 1a | BPSK | 1 | ACK/NACK | One codeword |
| 1b | QPSK | 2 | ACK/NACK | Two codeword |
| 2 | QPSK | 20 | CQI | Joint Coding ACK/NACK (extended CP) |
| 2a | QPSK + BPSK | 21 | CQI + ACK/NACK | Normal CP only |
| 2b | QPSK + BPSK | 22 | CQI + ACK/NACK | Normal CP only |

PUCCH format 1 is used for an independent transmission of SR (scheduling request). In case of the SR independent transmission, a non-modulated waveform is applicable. This shall be described in detail later.

PUCCH format 1a or PUCCH format 1b is used for a transmission of HARQ ACK/NACK. In case that HARQ ACK/NACK is independently transmitted in a random subframe, it may be able to use PUCCH format 1a or PUCCH format 1b. Moreover, both HARQ ACK/NACK may be transmitted in a same subframe using PUCCH format 1a or PUCCH format 1b.

PUCCH format 2 is used for a transmission of CQI. PUCCH format 2a or PUCCH format 2b is used for a transmission of CQI and HARQ ACK/NACK. In case of an extended CP, PUCCH format 2 may be available for a transmission of CQI and HARQ/NACK.

Figure 6:
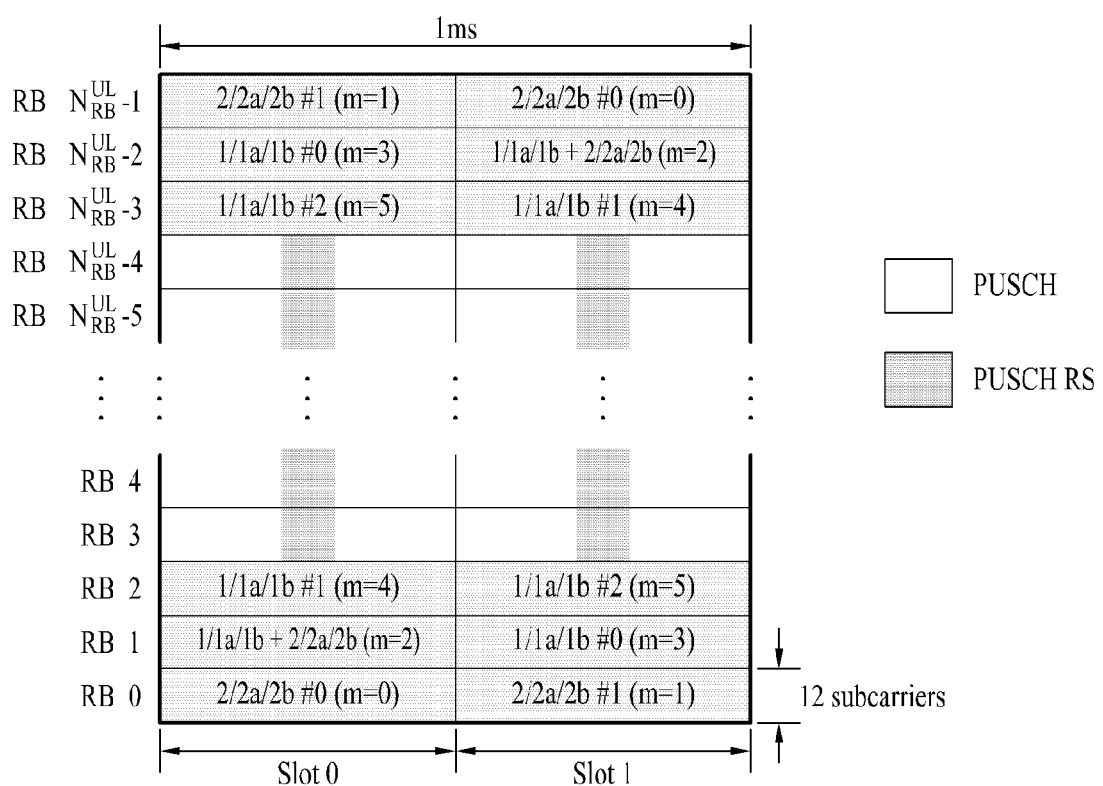
FIG. 6 is a diagram to illustrate how PUCCH formats are mapped to PUCCH regions in uplink physical resource blocks.

FIG. 6 shows a configuration of mapping PUCCH formats to PUCCH regions in an uplink (UL) physical resource block. In FIG. 5, the $N_{RB}^{UL}$ indicates the number of resource blocks in UL and 0, 1, . . . or $N_{RB}^{UL}-1$ means a physical resource block number. Basically, PUCCH is mapped to both side edges of a UL frequency block. Referring to FIG. 6, PUCCH format 2/2a/2b is be mapped to PUCCH regions indicated as 'm=0, 1', which can be represented as PUCCH format 2/2a/2b is mapped to resource blocks situated on a band edge. And, both PUCCH format 2/2a/2b and PUCCH format 1/1a/1b may be mixedly mapped to PUCCH region indicated as 'm=2'. Moreover, PUCCH format 1/1a/1b may be mapped to PUCCH regions indicated as 'm=3, 4, 5'. The number ($N^{(2)}_{RB}$) of PUCCH RBs available by PUCCH format 2/2a/2b may be notified to user equipments within a cell by broadcasting signaling.

In the following description, PUCCH formats are explained in detail.

PUCCH Format 1/1a/1b Channel Structure

Prior to the description of PUCCH format 1, PUCCH format 1a and PUCCH format 1b are described as follows.

In PUCCH format 1a/1b, a symbol modulated by BPSK or QPSK modulation scheme may be multiplied by a CAZAC sequence having a length of 12. for instance, if a modulated symbol d(0) is multiplied by N-length CAZAC sequence 'r(n) (n=0, 1, 2, . . . , N−1)', it may result in y(0), y(1), y(2), . . . , y(N−1). And, symbols y(0), . . . , y(N−1) may be named a block of symbols. After a modulated symbol has been multiplied by CAZAC sequence, block-wise spreading is applied using an orthogonal sequence.

For normal ACK/NACK information, a length-4 Hadamard sequence is used. For a shortened ACK/NACK information and reference signal, a length-3 DFT (discrete Fourier transform) sequence is used. For a reference signal in case of an extended CP, a length-2 Hadamard sequence is used.

Figure 7:
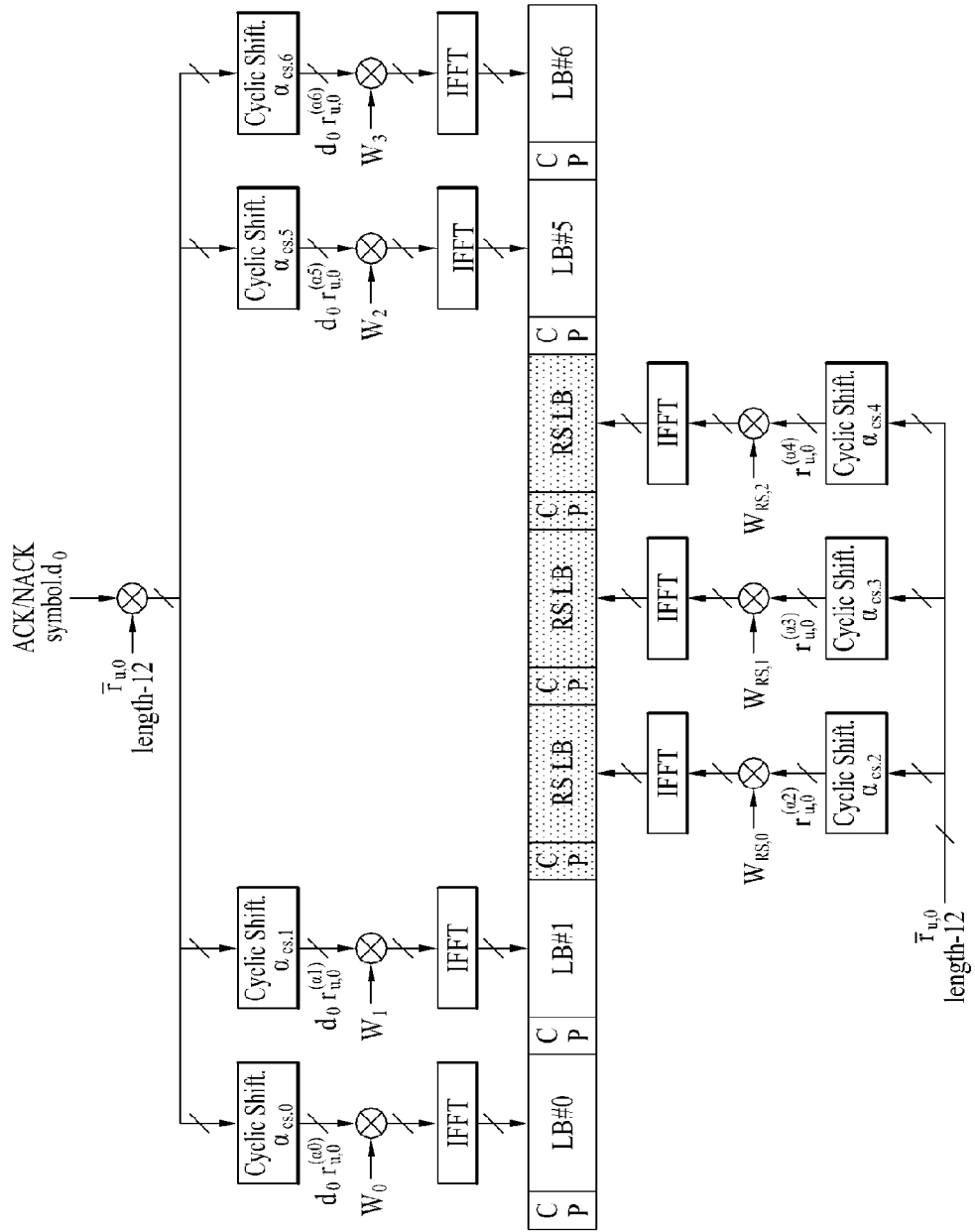
FIG. 7 is a diagram for a structure of ACK/NACK channel in case of a normal CP.

FIG. 7 shows a structure of ACK/NACK channel in case of a normal CP. FIG. 7 exemplarily shows PUCCH channel structure for HARQ ACK/NACK transmission without CQI. A reference signal (RS) is carried on 3 contiguous SC-FDMA symbols of a middle part in 7 OFDM symbols included in one slot and an ACK/NACK signal is carried on the 4 remaining SC-FDMA symbols. Meanwhile, in case of an extended CP, RS may be carried on 2 contiguous symbols of a middle part. The number and positions of symbols used for RS may vary in accordance with a control channel and the number and positions of symbols used for an associated ACK/NACK signal may vary correspondingly.

1-bit ACK/NACK information (unscrambled) may be represented as one HARQ ACK/NACK modulated symbol using BPSK scheme. And, 2-bit ACK/NACK information (unscrambled) may be represented as one HARQ ACK/NACK modulated symbol using QPSK scheme. Acknowledgement (ACK) may be encoded into '1', while Negative acknowledgement (NACK) may be encoded into '0'.

When a control signal is transmitted within an allocated band, 2-dimensional spreading may be applicable to increase multiplexing capacity. In particular, both frequency domain spread and time domain spread are simultaneously applied to increment the number of user equipments, which can be multiplexed, or the number of control channels. In order to spread ACK/NACK signal in frequency domain, a frequency domain sequence may be used as a base sequence. Zadoff-Chu (ZC) sequence corresponding to one of CAZAC sequences may be used as a frequency domain sequence. For instance, if different cyclic shifts (CS) are applied to ZC sequence as a basic sequence, it may be able to apply multiplexing of different user equipments or control channels. The number of CS resources supported by SC-FDMA symbol for PUCCH RBs provided for HARQ ACK/NACK transmission is set by a cell-specific upper-layer signaling parameter ($\Delta_{shift}^{PUCCH}$), and $\Delta_{shift}^{PUCCH} \in \{1, 2, 3\}$ indicates 12 shifts, 6 shifts or 4 shifts.

The frequency-domain-spread ACK/NACK signal is spread in time domain using an orthogonal spreading code. In particular, Walsh-Hadamard or DFT sequence may be usable as the orthogonal spreading code. For instance, ACK/NACK signal may be spread using an orthogonal sequence (w0, w1, w2, w3) having a length of 4 for 4 symbols. And, RS may be spread through an orthogonal sequence having a length of 3. This may be called orthogonal covering (OC).

A plurality of user equipments may be multiplexed by CDM (code division multiplex) using CS resources in frequency domain and OC resources in time domain mentioned in the foregoing description. In particular, ACK/NACK informations and RSs of a number of user equipments may be multiplexed together on the same PUCCH RB.

For this time domain spreading CDM, the number of spreading codes supported for ACK/NACK information is limited by the number of RS symbols. In particular, since the number of RS transmission SC-FDMA symbols is smaller than that of ACK/NACK information transmission SC-FDMA symbols, multiplexing capacity of RS becomes smaller than that of ACK/NACK information. For instance, as ACK/NACK information may be carried on 4 symbols in case of a normal CP, 3 orthogonal spreading codes as used for the ACK/NACK information instead of 4 orthogonal spreading codes. This is because 3 orthogonal spreading codes are available for RS only due to the RS transmission symbols of which number is limited to 3.

Examples of sequences used for the spread of ACK/NACK information may be shown in Table 2 and Table 3. Table 2 shows a sequence for a length-4 symbol. Table 3 shows a sequence for a length-3 symbol. A sequence for a length-4 symbol may be used for PUCCH format 1/1a/1b of a general subframe configuration. In consideration of a case that SRS (sounding reference signal) is transmitted on a last symbol of a $2^{nd}$ slot in a subframe configuration, a sequence for a length-4 symbol may be applied to a $1^{st}$ slot and a shortened PUCCH format 1/1a/1b of a sequence for a length-3 symbol may be applied to a $2^{nd}$ slot.

TABLE 2

| Sequence Index | [w(0), w(1), w(2), w(3)] |
|---|---|
| 0 | [+1 +1 +1 +1] |
| 1 | [+1 −1 +1 −1] |
| 2 | [+1 −1 −1 +1] |

TABLE 3

| Sequence Index | [w(0), w(1), w(2)] |
|---|---|
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

Meanwhile, one example of an orthogonal sequence used for a spread of RS of ACK/NACK channel is shown in Table 4.

TABLE 4

| Sequence Index | Normal CP | Extended CP |
|---|---|---|
| 0 | [1 1 1] | [1 1] |
| 1 | [1 $e^{j2\pi/3}$ $e^{j4\pi/3}$] | [1 −1] |
| 2 | [1 $e^{j4\pi/3}$ $e^{j2\pi/3}$] | N/A |

When 3 symbols are used for RS transmission in one slot of a subframe of a normal CP and 4 symbols are used for ACK/NACK information transmission therein, assuming that 6 cyclic shifts (CS) in frequency domain and 3 orthogonal spreading (OC) resources in time domain are available for example, HARQ ACK/NACK's from total 18 different user equipments may be multiplexed together within one PUCCH RB.

In the following description, PUCCH format 1 is explained. Scheduling request (SR) is transmitted in a manner that a user equipment requests to be scheduled or does not request to be scheduled. SR channel reuses ACK/NACK channel structure in PUCCH format 1a/1b and is configured by OOK (on-off keying) scheme based on ACK/NACK channel design. A reference signal is not transmitted on SR channel. Hence, a sequence having a length of 7 is used for a normal CP. And, a sequence having a length of 6 is used for an extended CP. Different cyclic shifts or orthogonal covers may be applied to SR and ACK/NACK, respectively.

Figure 8:
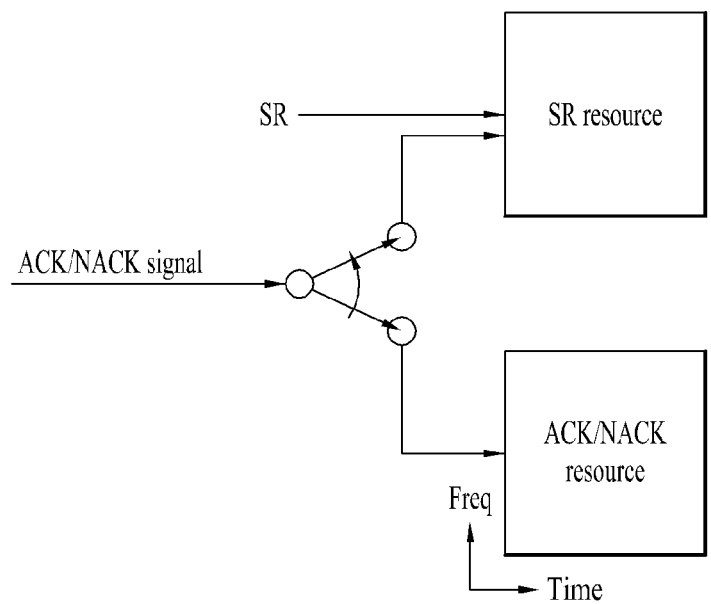
FIG. 8 is a diagram to illustrate a case of transmitting both ACK/NACK information and SR simultaneously.

With reference to FIG. 8, a case of transmitting ACK/NACK information and SR simultaneously is described as follows. As mentioned in the foregoing description, a user equipment may be able to transmit HARQ ACK/NACK and SR in a same subframe. For a positive SR transmission, a user equipment transmits HARQ ACK/NACK on a resource allocated for SR. For a negative SR transmission, a user equipment transmits HARQ ACK/NACK on a resource allocated for ACK/NACK.

HARQ ACK/NACK Information Transmitting Scheme

In case of operation by TDD in the legacy LTE system (e.g., LTE Release-8, LTE Release-9), a base station may be able to transmit PDSCHs to a user equipment in a plurality of DL subframes and the user equipment may be able to feed back HARQ ACK/NACK information, which indicates whether decoding of a plurality of the PDSCHs has been successfully completed, to the base station. In this LTE TDD system, HARQ ACK/NACK information may be transmitted in two ways.

First of all, ACK/NACK bundling transmission is described as follows.

In case of the ACK/NACK bundling transmission, ACK/NACK responses to a plurality of data units (e.g., transport block or codeword unit) may be combined together by logical AND operation. Thus, if a plurality of the ACK/NACK responses are combined together, it may be represented as ACK/NACK bundling. For instance, if a receiving end successfully decodes (or detects) all data units, ACK may be transmitted using a single ACK/NACK unit. If the receiving end fails in decoding (or detecting) at least one of all data units, NACK may be transmitted using a single ACK/NACK unit or nothing may be transmitted as ACK/NACK information.

Secondly, ACK/NACK multiplexing is described as follows.

In case of the ACK/NACK multiplexing, contents of ACK/NACK responses to a plurality of data units may be identified by a combination of ACK/NACK unit actually used for ACK/NACK transmission and one of QPSK modulated symbols. For instance, assume that a single ACK/NACK unit carries 2-bit information and that maximum 2 data units are received. In doing so, assume that HARQ ACK/NACK for each of the received data units is represented by 1 ACK/NACK bit. In this case, a transmitting end having transmitted data may be able to identify ACK/NACK result like Table 5 shown in the following.

TABLE 5

| HARQ-ACK(0), HARQ-ACK(1) | $n_{PUCCH}^{(1)}$ | b(0), b(1) |
|---|---|---|
| ACK, ACK | $n_{PUCCH,1}^{(1)}$ | 1, 1 |
| ACK, NACK/DTX | $n_{PUCCH,0}^{(1)}$ | 0, 1 |
| NACK/DTX, ACK | $n_{PUCCH,1}^{(1)}$ | 0, 0 |
| NACK/DTX, NACK | $n_{PUCCH,1}^{(1)}$ | 1, 0 |
| NACK, DTX | $n_{PUCCH,0}^{(1)}$ | 1, 0 |
| DTX, DTX | N/A | N/A |

In Table 5, HARQ-ACK(i) (i=0, 1) indicates ACK/NACK result for a data unit i. In Table 5, since maximum 2 data units (data unit 0 and data unit 1) are assumed as received, as mentioned in the foregoing description, ACK/NACK result for the data unit 0 is represented as HARQ-ACK (0) and ACK/NACK result for the data unit 10 is represented as HARQ-ACK (1). In Table 5, DTX (discontinuous transmission) indicates that the data unit corresponding to HARQ-ACK(i) is not transmitted or that a receiving end is unable to detect a presence of the data unit corresponding to HARQ-ACK(i). Moreover, $n_{PUCCH,X}^{(1)}$ indicates ACK/NACK unit actually used for ACK/NACK transmission. If maximum 2 ACK/NACK units are present, it may be represented as $n_{PUCCH,0}^{(1)}$ and $n_{PUCCH,1}^{(1)}$. Moreover, b(0) and b(1) indicate 2 bits transmitted by the selected ACK/NACK unit. Modulated symbol transmitted via the ACK/NACK unit may be determined in accordance with the bits b(0) and b(1).

For instance, if a receiving end successfully receives and decodes 2 data units (i.e., the case of 'ACK, ACK' in Table 5), the receiving end transmits 2 bits (1, 1) using the ACK/NACK unit $n_{PUCCH,1}^{(1)}$. Alternatively, when a receiving end receives 2 data units, if the receiving end fails in decoding (or detecting) the $1^{st}$ data unit (i.e., data unit 0 corresponding to HARQ-ACK(0)) but succeeds in decoding the $2^{nd}$ data unit (i.e., data unit 1 corresponding to HARQ-ACK(1) [i.e., the case of 'NACK/DTX, ACK' in Table 5], the receiving end transmits 2 bits (0, 0) using the ACK/NACK unit $n_{PUCCH,1}^{(1)}$.

Thus, by linking a combination (i.e., combination of selection of either $n_{PUCCH,0}^{(1)}$ or $n_{PUCCH,1}^{(1)}$ and 'b(0), b(1)') of the selection of ACK/NACK unit and an actual bit content of the selected ACK/NACK unit to a content of an actual ACK/NACK, it may be able to transmit ACK/NACK information on a plurality of data units using a single ACK/NACK unit. In a manner of expanding the multiplexing principle mentioned in the foregoing description, ACK/NACK multiplexing of data units, of which number is greater than 2, can be implemented with ease.

In this ACK/NACK multiplexing scheme, in case that at least one ACK exists for all data units basically, NACK and DTX may not be discriminated from each other (i.e., NACK and DTX may be coupled with each other as represented 'NACK/DTX' in Table 5). This is because the combination of ACK/NACK unit and QPSK modulated symbol is not enough to reflect all ACK/NACK states (i.e., ACK/NACK hypotheses) possibly occurring in case of attempting to represent NACK and DTX identifiably. Meanwhile, in case that ACK does not exist for all data units (i.e., a case that either NACK or ACK exists for all data units only), it may be able to define a case of one confirmed NACK indicating that one of HARQ-ACK(i)'s is certainly NACK (i.e., NACK discriminated from DTX). In this case, ACK/NACK unit corresponding to a data unit matching one certain NACK may be reserved to transmit signals of a plurality of ACK/NACK's.

In this ACK/NACK multiplexing scheme, if the maximum number of data units transmittable within a size of a given physical resource increases, the number (i.e., the number of ACK/NACK hypotheses) of cases of ACK/NACK states required for ACK/NACK multiplexing of all data units may increase exponentially. For instance, assuming that the maximum number of data units is set to N and that the number of ACK/NACK units corresponding to the N data units is set to $N_A$, $2^N$ ACK/NACK hypotheses are required for the ACK/NACK multiplexing despite excluding the case of DTX. Meanwhile, if a method of selecting one ACK/NACK is applied, as shown in the foregoing example, it may be able to support maximum $4N_A$ ACK/NACK hypotheses only. In particular, as the number of data units increases, the method of selecting one ACK/NACK needs relatively more ACK/NACK units. Hence, overhead of control channel resource required for transmitting signals for a plurality of ACK/NACK's increases correspondingly. For instance, when maximum 5 data units are transmitted (i.e., N=5), the number of ACK/NACK hypotheses required for the ACK/NACK multiplexing becomes $2^N$ (=32). Since $32=4N_A$, it may be able to implement the ACK/NACK multiplexing using 8 ACK/NACK units (i.e., $N_A$=8).

PUCCH Format 2/2a/2b Channel Structure

In the following description, PUCCH format 2/2a/2b is explained. PUCCH format 2/2a/2b is a control channel to transmit channel measurement feedback (CQI, PMI, RI).

A reporting cycle of channel measurement feedback (hereinafter, commonly called CQI information) and a frequency unit (or a frequency resolution) becoming a measurement target may be controlled by a base station. In time domain, periodic CQI reporting and aperiodic CQI reporting may be supported. PUCCH format 2 is used for the periodic reporting only, while PUSCH may be available for the aperiodic reporting. In case of the aperiodic reporting, a base station may instruct a user equipment to transmit an individual CQI report in a manner that the individual CQI report is loaded on a resource scheduled for UL data transmission.

Figure 9:
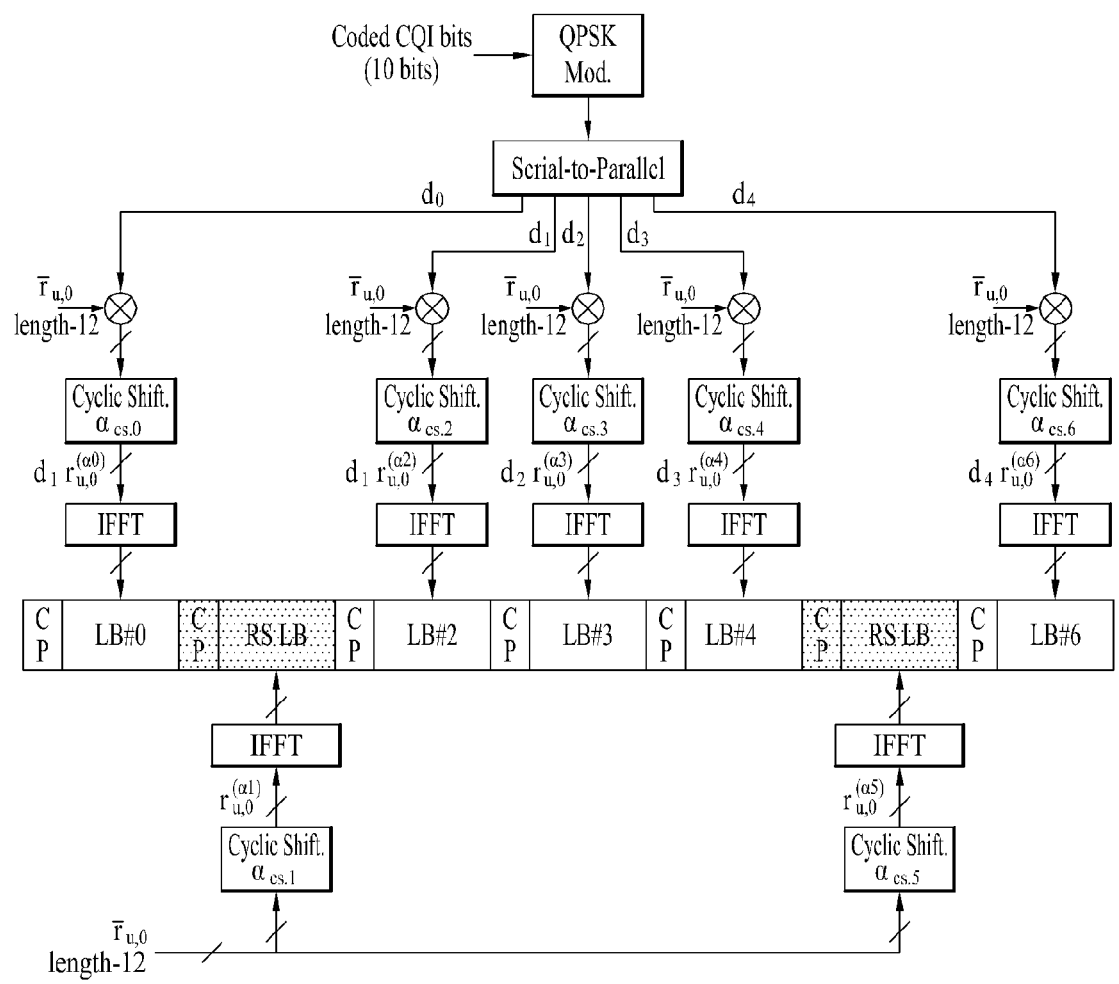
FIG. 9 is a diagram for a structure of CQI channel in case of a normal CP.

FIG. 9 shows a structure of CQI channel in case of a normal CP. Among SC-FDMA symbols of one slot, SC-FDMA symbol 1 (i.e., $2^{nd}$ symbol) and SC-FDMA symbol 5 (i.e., $6^{th}$ symbol) are used for DMRS (demodulation reference signal) transmission and CQI information may be transmitted in the rest of the SC-FDMA symbols. On the other hand, in case of an extended CP, one SC-FDMA symbol (i.e., SC-FDMA symbol 3) is used for the DMRS transmission.

According to PUCCH format 2/2a/2b, modulation by CAZAC sequence is supported and a QPSK modulated symbol is multiplied by CAZAC sequence having a length of 12. A cyclic shift of a sequence may be changed between a symbol and a sot. Orthogonal covering is used for DMRS.

Reference signals (DMRS) are carried on 2 SC-FDMA symbols spaced apart from each other by an interval of 3 SC-FDMA symbols among 7 SC-FDMA symbols included in one slot, while CQI information is carried on the 5 remaining SC-FDMA symbols. Two reference signals (RSs) are used within one slot to support a high-speed user equipment. Each user equipment may be identifiable using a sequence. CQI information symbols are modulated and delivered to all SC-FDMA symbols. And, SC-FDMA symbols include one sequence. In particular, a user equipment modulates CQI with each sequence and then transmits the modulated CQI.

The number of symbols transmittable in one TTI is 10 and modulation of CQI information is determined up to QPSK. When QPSK mapping is used for SC-FDMA symbol, since 2-bit CQI value may be carried, 10-bit CQI value may be carried on one slot. Hence, maximum 20-bit CQI value may be carried on one subframe. In order to spread CQI information in frequency domain, frequency domain spreading code is used.

CAZAC sequence (e.g., ZC sequence) of a length-12 may be used as a frequency domain spreading code. Each control channel may be identifiable in a manner of applying CAZAC sequence having a different cyclic shift value. IFFT is performed on the frequency-domain-spread CQI information.

By cyclic shift having 12 equivalent intervals, 12 different user equipments can be orthogonally multiplexed together on the same PUCCH RB. In cased of a normal CP, although DMRS sequence on SC-FDMA symbol 1 or 5 (or, SC-FDMA symbol 3 in case of an extended CP) is similar to a CQI signal sequence in frequency domain, the same modulation of CQI information is not applied. A user equipment may be semi-statically settable by an upper layer signaling to periodically report different CQI, PMI and RI types on PUCCH resource indicated by a PUCCH resource index ($n_{PUCCH}^{(2)}$). In this case, the PUCCH resource index $n_{PUCCH}^{(2)}$ is the information that indicates a PUCCH region used for PUCCH format 2/2a/2b and a cyclic shift (CS) value to be used.

Sounding Reference Signal

Sounding reference signal (hereinafter abbreviated SRS) is an uplink (UL) signal used to measure a UL channel quality. The SRS may be periodically transmitted to a base station from a user equipment. The base station receives sounding reference signals from user equipments, measures UL channel, allocates a UL resource to each of the user equipments, and may be then able to notify a corresponding result to each of the user equipments. A sounding reference signal may b transmitted in an interval in which SC-FDMA symbol situated at a last position in one UL subframe. In the following description, structure and configuration of SRS are explained in detail.

A sounding reference signal is configured with a CAZAC (constant amplitude zero auto correlation) sequence. And, sounding reference signals transmitted from a plurality of user equipments correspond to the CAZAC sequence ($r^{SRS}(n)=r_{u,v}^{(\alpha)}(n)$) having different cyclic shift values ($\alpha$).

$$\alpha = 2\pi \frac{n_{SRS}^{cs}}{8} \quad \text{[Formula 1]}$$

In Formula 1, $n_{SRS}^{cs}$ is a value set for each user equipment by an upper layer and has an integer value ranging from 0 to 7.

CAZAC sequences are generated from one CAZAC sequence through cyclic shift. And, each of the generated CAZAC sequences is characterized in having a zero correlation value with sequences having different cyclic shift values from that of the corresponding CAZAC sequence. Using this characteristic, sounding reference signals in the same frequency domain can be identified according to the CAZAC sequence cyclic shift values, respectively. A sounding reference signal of each user equipment is allocated on a frequency according to a parameter set by a base station. A user equipment performs a frequency hopping of a sounding reference signal to enable the sounding reference signal to be transmitted on a whole uplink data transmission bandwidth.

In the following description, a method of mapping a physical resource to transmit a sounding reference signal in an LTE system is explained in detail.

First of all, a sounding reference signal $r^{SRS}(n)$ is multiplied by an amplitude scaling factor $\beta_{SRS}$ to meet a priority transmission power $P_{SRS}$ and is then mapped to a resource element (RE) having an index (k,l) from $r^{SRS}(0)$ by Formula 2.

$$a_{2k+k_0,l} = \begin{cases} \beta_{SRS} r^{SRS}(k) & k = 0, 1, \ldots, M_{sc,b}^{RS} - 1 \\ 0 & \text{otherwise} \end{cases} \quad \text{[Formula 2]}$$

In Formula 2, $k_0$ indicates a frequency domain start point of a sounding reference signal and $M_{sc,b}^{RS}$ indicates a length of a sounding reference signal sequence represented by a sub-carrier unit defined as Formula 3 (i.e., a bandwidth).

$$M_{sc,b}^{RS} = m_{SRS,b} N_{sc}^{RB}/2 \quad \text{[Formula 3]}$$

In Formula 3, $m_{SRS,b}$ is a value signaled from a base station according to an uplink bandwidth $N_{RB}^{UL}$ shown in Tables 6 to 9. In order to obtain $m_{SRS,b}$, a cell specific parameter $C_{SRS}$ amounting to an integer value ranging from 0 to 7 and a user equipment specific parameter $B_{SRS}$ amounting to an integer value ranging from 0 to 3 are necessary. Values of $C_{SRS}$ and $B_{SRS}$ are given by an upper layer.

Table 6 shows $m_{SRS,b}$ and $N_b$ (b=0, 1, 2, 3), values for the uplink bandwidth of $6 \leq N_{RB}^{UL} \leq 40$.

TABLE 6

| SRS bandwidth configuration | SRS-Bandwidth $B_{SRS}=0$ | | SRS-Bandwidth $B_{SRS}=1$ | | SRS-Bandwidth $B_{SRS}=2$ | | SRS-Bandwidth $B_{SRS}=3$ | |
|---|---|---|---|---|---|---|---|---|
| $C_{SRS}$ | $m_{SRS,b}$ | $N_b$ | $m_{SRS,b}$ | $N_b$ | $m_{SRS,b}$ | $N_b$ | $m_{SRS,b}$ | $N_b$ |
| 0 | 36 | 1 | 12 | 3 | 4 | 3 | 4 | 1 |
| 1 | 32 | 1 | 16 | 2 | 8 | 2 | 4 | 2 |
| 2 | 24 | 1 | 4 | 6 | 4 | 1 | 4 | 1 |
| 3 | 20 | 1 | 4 | 5 | 4 | 1 | 4 | 1 |
| 4 | 16 | 1 | 4 | 4 | 4 | 1 | 4 | 1 |
| 5 | 12 | 1 | 4 | 3 | 4 | 1 | 4 | 1 |
| 6 | 8 | 1 | 4 | 2 | 4 | 1 | 4 | 1 |
| 7 | 4 | 1 | 4 | 1 | 4 | 1 | 4 | 1 |

Table 7 shows $m_{SRS,b}$ and $N_b$ (b=0, 1, 2, 3), values for the uplink bandwidth of $40 < N_{RB}^{UL} \leq 60$.

TABLE 7

| SRS bandwidth configuration | SRS-Bandwidth $B_{SRS}=0$ | | SRS-Bandwidth $B_{SRS}=1$ | | SRS-Bandwidth $B_{SRS}=2$ | | SRS-Bandwidth $B_{SRS}=3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 48 | 1 | 24 | 2 | 12 | 2 | 4 | 3 |
| 1 | 48 | 1 | 16 | 3 | 8 | 2 | 4 | 2 |
| 2 | 40 | 1 | 20 | 2 | 4 | 5 | 4 | 1 |
| 3 | 36 | 1 | 12 | 3 | 4 | 3 | 4 | 1 |
| 4 | 32 | 1 | 16 | 2 | 8 | 2 | 4 | 2 |
| 5 | 24 | 1 | 4 | 6 | 4 | 1 | 4 | 1 |
| 6 | 20 | 1 | 4 | 5 | 4 | 1 | 4 | 1 |
| 7 | 16 | 1 | 4 | 4 | 4 | 1 | 4 | 1 |

Table 8 shows $m_{SRS,b}$ and $N_b$ (b=0, 1, 2, 3), values for the uplink bandwidth of $60 < N_{RB}^{UL} \leq 80$.

TABLE 8

| SRS bandwidth configuration | SRS-Bandwidth $B_{SRS}=0$ | | SRS-Bandwidth $B_{SRS}=1$ | | SRS-Bandwidth $B_{SRS}=2$ | | SRS-Bandwidth $B_{SRS}=3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 72 | 1 | 24 | 3 | 12 | 2 | 4 | 3 |
| 1 | 64 | 1 | 32 | 2 | 16 | 2 | 4 | 4 |
| 2 | 60 | 1 | 20 | 3 | 4 | 5 | 4 | 1 |
| 3 | 48 | 1 | 24 | 2 | 12 | 2 | 4 | 3 |
| 4 | 48 | 1 | 16 | 3 | 8 | 2 | 4 | 2 |
| 5 | 40 | 1 | 20 | 2 | 4 | 5 | 4 | 1 |
| 6 | 36 | 1 | 12 | 3 | 4 | 3 | 4 | 1 |
| 7 | 32 | 1 | 16 | 2 | 8 | 2 | 4 | 2 |

Table 9 shows $m_{SRS,b}$ and $N_b$ (b=0, 1, 2, 3), values for the uplink bandwidth of $80 < N_{RB}^{UL} \leq 110$.

TABLE 9

| SRS bandwidth configuration | SRS-Bandwidth $B_{SRS}=0$ | | SRS-Bandwidth $B_{SRS}=1$ | | SRS-Bandwidth $B_{SRS}=2$ | | SRS-Bandwidth $B_{SRS}=3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 96 | 1 | 48 | 2 | 24 | 2 | 4 | 6 |
| 1 | 96 | 1 | 32 | 3 | 16 | 2 | 4 | 4 |
| 2 | 80 | 1 | 40 | 2 | 20 | 2 | 4 | 5 |
| 3 | 72 | 1 | 24 | 3 | 12 | 2 | 4 | 3 |
| 4 | 64 | 1 | 32 | 2 | 16 | 2 | 4 | 4 |
| 5 | 60 | 1 | 20 | 3 | 4 | 5 | 4 | 1 |
| 6 | 48 | 1 | 24 | 2 | 12 | 2 | 4 | 3 |
| 7 | 48 | 1 | 16 | 3 | 8 | 2 | 4 | 2 |

As mentioned in the foregoing description, to enable a sounding reference signal to be transmitted on a whole uplink data bandwidth, a user equipment is able to perform a frequency hopping of the sounding reference signal. And, this frequency hopping is set by a parameter $b_{hop}$ having a value ranging from 0 to 3 given by an upper layer.

If the frequency hopping of the sounding reference signal is deactivated, i.e., $b_{hop} \geq B_{SRS}$, a frequency position index $n_b$ has a constant value, as shown in Formula 4. In this case, $n_{RRC}$ is a parameter given by an upper layer.

$$n_b = \lfloor 4n_{RRC}/m_{SRS,b} \rfloor \bmod N_b \quad \text{[Formula 4]}$$

On the contrary, if the frequency hopping of the sounding reference signal is activated, i.e., $b_{hop} < B_{SRS}$, a frequency position index $n_b$ is defined by Formula 5 and Formula 6.

$$n_b = \begin{cases} \lfloor 4n_{RRC}/m_{SRS,b} \rfloor \bmod N_b & b \leq b_{hop} \\ \{F_b(n_{SRS}) + \lfloor 4n_{RRC}/m_{SRS,b} \rfloor\} \bmod N_b & \text{otherwise} \end{cases} \quad \text{[Formula 5]}$$

$$F_b(n_{SRS}) = \begin{cases} (N_b/2) \left\lfloor \dfrac{n_{SRS} \bmod \prod_{b'=b_{hop}}^{b} N_{b'}}{\prod_{b'=b_{hop}}^{b-1} N_{b'}} \right\rfloor + \left\lfloor \dfrac{n_{SRS} \bmod \prod_{b'=b_{hop}}^{b} N_{b'}}{2 \prod_{b'=b_{hop}}^{b-1} N_{b'}} \right\rfloor & \text{if } N_b \text{ even} \\ \lfloor N_b/2 \rfloor \left\lfloor n_{SRS} \Big/ \prod_{b'=b_{hop}}^{b-1} N_{b'} \right\rfloor & \text{if } N_b \text{ odd} \end{cases}$$

[Formula 6]

In this case, $n_{SRS}$ is a parameter for calculating a count of transmitting a sounding reference signal and depends on Formula 7.

$$n_{SRS} = \begin{cases} 2N_{SP}n_f + 2(N_{SP}-1)\left\lfloor \dfrac{n_s}{10} \right\rfloor + \left\lfloor \dfrac{T_{offset}}{T_{offset\_max}} \right\rfloor \\ \lfloor (n_f \times 10 + \lfloor n_s/2 \rfloor)/T_{SRS} \rfloor \end{cases}$$

[Formula 7]

In FIG. 7, $$n_{SRS} = 2N_{SP}n_f + 2(N_{SP}-1)\left\lfloor \dfrac{n_s}{10} \right\rfloor + \left\lfloor \dfrac{T_{offset}}{T_{offset\_max}} \right\rfloor$$

is for SRS period for 2 ms in TDD frame structure, and $n_{SRS} = \lfloor (n_f \times 10 + \lfloor n_s/2 \rfloor)/T_{SRS} \rfloor$ is for other cases. In Formula 7, $T_{SRS}$ indicates a periodicity of a sounding reference signal and $T_{offset}$ indicates a subframe offset of a sounding reference signal. Moreover, $n_s$ indicates a slot number and $n_f$ indicates a frame number.

A user equipment specific sounding signal reference signal setting index $I_{SRS}$ for setting a periodicity $T_{SRS}$ of a sounding reference signal and a subframe offset $T_{offset}$ is represented as Table 10 and Table 11 according to FDD and TDD, respectively.

Table 10 shows UE-specific SRS periodicity $T_{SRS}$ and subframe offset configuration $T_{offset}$ in case of FDD.

TABLE 10

| SRS Configuration Index $I_{SRS}$ | SRS Periodicity $T_{SRS}$ (ms) | SRS Subframe Offset $T_{offset}$ |
|---|---|---|
| 0-1 | 2 | $I_{SRS}$ |
| 2-6 | 5 | $I_{SRS}$ - 2 |
| 7-16 | 10 | $I_{SRS}$ - 7 |
| 17-36 | 20 | $I_{SRS}$ - 17 |
| 37-76 | 40 | $I_{SRS}$ - 37 |
| 77-156 | 80 | $I_{SRS}$ - 77 |
| 157-316 | 160 | $I_{SRS}$ - 157 |
| 317-636 | 320 | $I_{SRS}$ - 317 |
| 637-1023 | reserved | reserved |

Table 11 shows UE-specific SRS periodicity $T_{SRS}$ and subframe offset configuration $T_{offset}$ in case of TDD.

TABLE 11

| Configuration Index $I_{SRS}$ | SRS Periodicity $T_{SRS}$ (ms) | SRS Subframe Offset $T_{offset}$ |
|---|---|---|
| 0 | 2 | 0, 1 |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10-14 | 5 | $I_{SRS}$ - 10 |
| 15-24 | 10 | $I_{SRS}$ - 15 |
| 25-44 | 20 | $I_{SRS}$ - 25 |
| 45-84 | 40 | $I_{SRS}$ - 45 |
| 85-164 | 80 | $I_{SRS}$ - 85 |
| 165-324 | 160 | $I_{SRS}$ - 165 |
| 325-644 | 320 | $I_{SRS}$ - 325 |
| 645-1023 | reserved | reserved |

Extended UL Control Information Transmission Scheme

In a multi-carrier supportive system (e.g., 3GPP LTE-A system), a size of UL control information may increase more than that of UL control information in a legacy single-carrier supportive system (e.g., 3GPP LTE Release-8. 3GPP LTE Release-9, etc.).

For instance, since DL data of maximum 2 transport blocks (or codewords) can be received on a single PDSCH in a single subframe in case of SU-MIMO (single user-MIMO) in a legacy LTE system, it is enough to transmit maximum 2 HARQ ACK/NACK informations. Yet, in a multi-carrier supportive system, a user equipment receives DL data via a plurality of PDSCHs on a plurality of DL cells, for example, and may need to transmit at least tow or more HARQ ACK/NACK informations. In doing so, a plurality of the HARQ ACK/NACK informations may be configured to carry such control information as HARQ ACK/NACK information and the like on one specific UL cell (e.g., UL P-cell, etc.) set as a main UL cell only.

If a plurality of ACK/NACK informations are transmitted in one subframe using PUCCH format 1a/1b, it may require high transmission power and increase PAPR of a UL transmission signal, whereby a coverage of a user equipment from a base station may decrease due to an inefficient use of a transmission power amplifier. In this case, it may be able to consider applying an ACK/NACK bundling or an ACK/NACK multiplexing to perform PUCCH format 1a/1b transmission. Yet, if DL data are received via numerous DL cells, excessive ACK/NACK bits exist. Hence, it may be difficult to perform a single PUCCH format 1a/1b transmission by directly applying the ACK/NACK bundling or multiplexing scheme or a plurality of ACK/NACK informations may not be correctly transmitted.

Moreover, in TDD mode, in case that DL data are transmitted in DL subframes of which number is greater than that of UL subframes, it may be also difficult to perform a single PUCCH format 1a/1b transmission by directly applying the ACK/NACK bundling or multiplexing scheme or a plurality of ACK/NACK informations may not be correctly transmitted as well.

Therefore, in order to transmit UL control information (e.g., ACK/NACK information) having a size extended greater than that of a conventional UL control information, the channel selection or block spreading scheme mentioned in the following description may be applicable.

Channel Selection Scheme

According to a channel selection scheme similar to the ACK/NACK multiplexing scheme in LTE TDD system mentioned in the foregoing description, after a plurality of identifiable PUCCH format 1a/1b resources have been allocated to a user equipment, a plurality of ACK/NACK informations are transmitted by a combination of 'whether the user equipment transmits the ACK/NACK information on a prescribed one of a plurality of PUCCH resources' and 'a modulation value applied to the selected resource'.

For instance, when PUCCH format 1a or PUCCH format 1b is used for UL ACK/NACK transmission, it may be able to transmit 1- or 2-bit ACK/NACK information. Yet, for example, if a plurality of PDSCH transmissions are performed in one DL subframe and ACK/NACK information on each of a plurality of the PDSCH transmissions is supposed to be transmitted in a single UL subframe, as performed in a multi-carrier system, or if ACK/NACK information on each of a plurality of PDSCH transmissions in a plurality of DL subframes in TDD mode is supposed to be transmitted in a single UL subframe, a method of representing ACK/NACK information having a size greater than that of ACK/NACK information acceptable by the conventional PUCCH format 1a/1b may be demanded.

To this end, in order to represent ACK/NACK information of which size is greater than the conventional maximum 2 bits, it may be able to increase a bit size for all ACK/NACK transmissions in a manner of reserving different transmission resources for PUCCH format 1a/1b and then applying a corresponding channel selection. For instance, a 2-bit part is represented via the conventional PUCCH format 1b and a part exceeding 2 bits may be represented via the channel selection.

Figure 10:
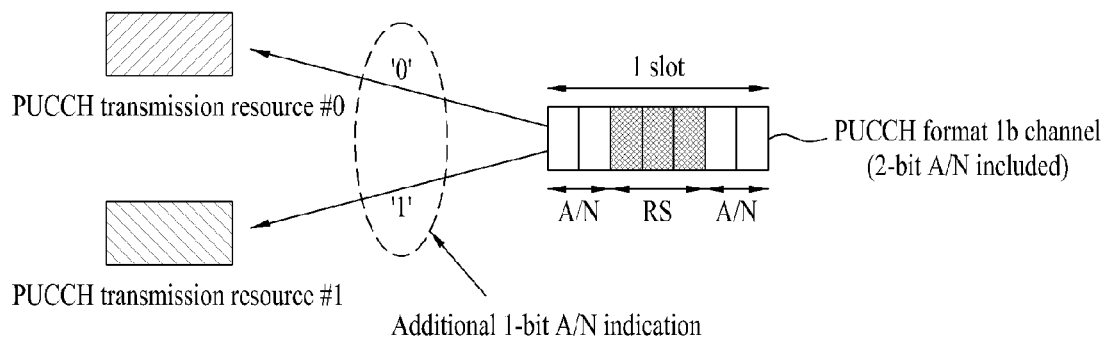
FIG. 10 is a diagram for one example of ACK/NACK channel selection.

FIG. 10 is a diagram for one example of ACK/NACK channel selection. A method of representing 3-bit ACK/NACK information using a channel selection scheme is exemplarily described with reference to FIG. 10 as follows. To this end, after 2 different ACK/NACK PUCCH transmission resources have been configured and reserved, 1-bit information may be additionally represented based on a hypothesis for performing the transmission by selecting which one of the reserved two different ACK/NACK PUCCH transmission resources (i.e., channel selection). In particular, referring to FIG. 10, 2 PUCCH format 1 resources (i.e., PUCCH transmission resource #0 and PUCCH transmission resource #1) can be configured for 2-bit ACK/NACK PUCCH format 1b. In case that 3-bit ACK/NACK information is transmitted, 2 bits in the 3-bit ACK/NACK information may be represented via the PUCCH format 1b and the remaining 1 bit may be represented in a manner of selecting which one of the 2 PUCCH transmission resources. For instance, it may be able to build a following hypothesis. First of all, if the PUCCH transmission resource #0 is selected, it may mean '0'. Secondly, if the PUCCH transmission resource #1 is selected, it may mean '1'. Thus, if one of the 2 PUCCH transmission resources is selected, it may be able to represent 1 bit (i.e., 0 or 1). Therefore, additional 1-bit ACK/NACK information can be represented together with the 2-bit ACK/NACK information represented via the PUCCH format 1b.

Thus, if the channel selection is applied to the ACK/NACK information transmission, a user equipment may be able to ACK/NACK information having an increasing bit number using transmission energy for transmitting one PUCCH only. Meanwhile, in order to detect the ACK/NACK channel selection applied PUCCH, a base station may attempt to detect all the configured PUCCH transmission resources.

As mentioned in the above description with reference to FIG. 10, in order to apply the ACK/NACK channel selection scheme, it may be necessary to make a reservation of a plurality of ACK/NACK PUCCH transmission resources. In particular, in case that a plurality of ACK/NACK PUCCH transmission resources are configured, it may be able to represent ACK/NACK information in a larger size based on which PUCCH resource is used.

Block Spreading Scheme

Block spreading scheme, unlike the conventional PUCCH format 1 or 2 series, corresponds to a method of modeling control signal transmission by SC-FDMA. By the block spreading, PUCCH multiplexing capacity may be increased according to a spreading factor (hereinafter abbreviated SF). The block spreading scheme mentioned in the following description may mean the scheme of multiplexing a plurality of user equipments on the same RB by discriminating the user equipments from each other using a block spreading code (i.e., an orthogonal code).

Figure 11:
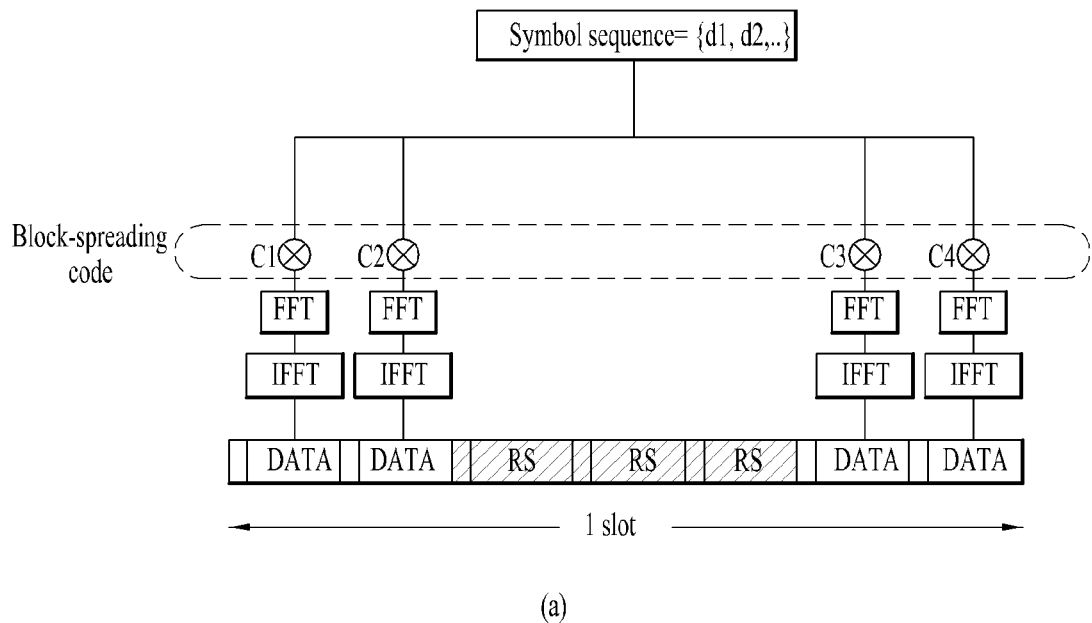
FIG. 11 is a diagram for describing the principle of block spreading.
Figure 11:
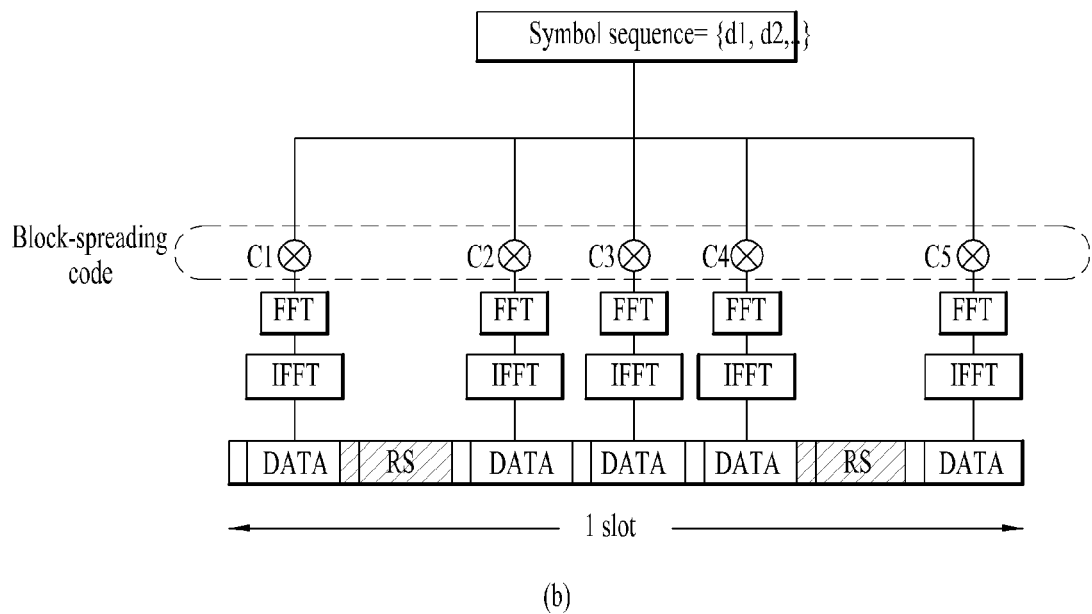

FIG. 11 is a diagram for describing the principle of block spreading in case of a normal CP. FIG. 11 (a) shows the block spreading scheme used for ACK/NACK information transmission on PUCCH. And, FIG. 11 (b) shows the block spreading scheme used for CQI information transmission on PUCCH.

In the example shown in FIG. 11 (a), data may correspond to an ACK/NACK data sequence transmitted on PUCCH. In the example shown in FIG. 11 (a), the block spreading of SF 4 (i.e., using a length-4 block spreading code) is applied to ACK/NACK data and 4 SC-FDMA symbols may be generated and transmitted. In the example shown in FIG. 11 (b), data may correspond to a CQI data sequence transmitted on PUCCH. In the example shown in FIG. 11 (b), the block spreading of SF 5 (i.e., using a length-5 block spreading code) is applied to CQI data and 5 SC-FDMA symbols may be generated and transmitted. Meanwhile, the block spreading of 'SF=3' may be applied to a reference signal (RS) part shown in FIG. 11 (a), while the block spreading of 'SF=2' may be applied to a reference signal (RS) part shown in FIG. 11 (b).

In the example shown in FIG. 11, a symbol sequence may correspond to a length-12 modulated symbol. Moreover, referring to the example shown in FIG. 11, a cyclic shift (CS) is not applied to the symbol sequence. In particular, the symbol sequence is block-wise spread by a block spreading code, undergoes FFT and IFFT, and may be then transmitted on each transmission symbol (e.g., OFDM symbol).

Method of Transmitting SRS and Extended UL Control Information

When UL control information is transmitted by one of the various schemes or methods mentioned in the foregoing description, it may be able to assume a case that a transmission of SRS is configured in the same subframe of transmitting the UL control information.

Figure 12:
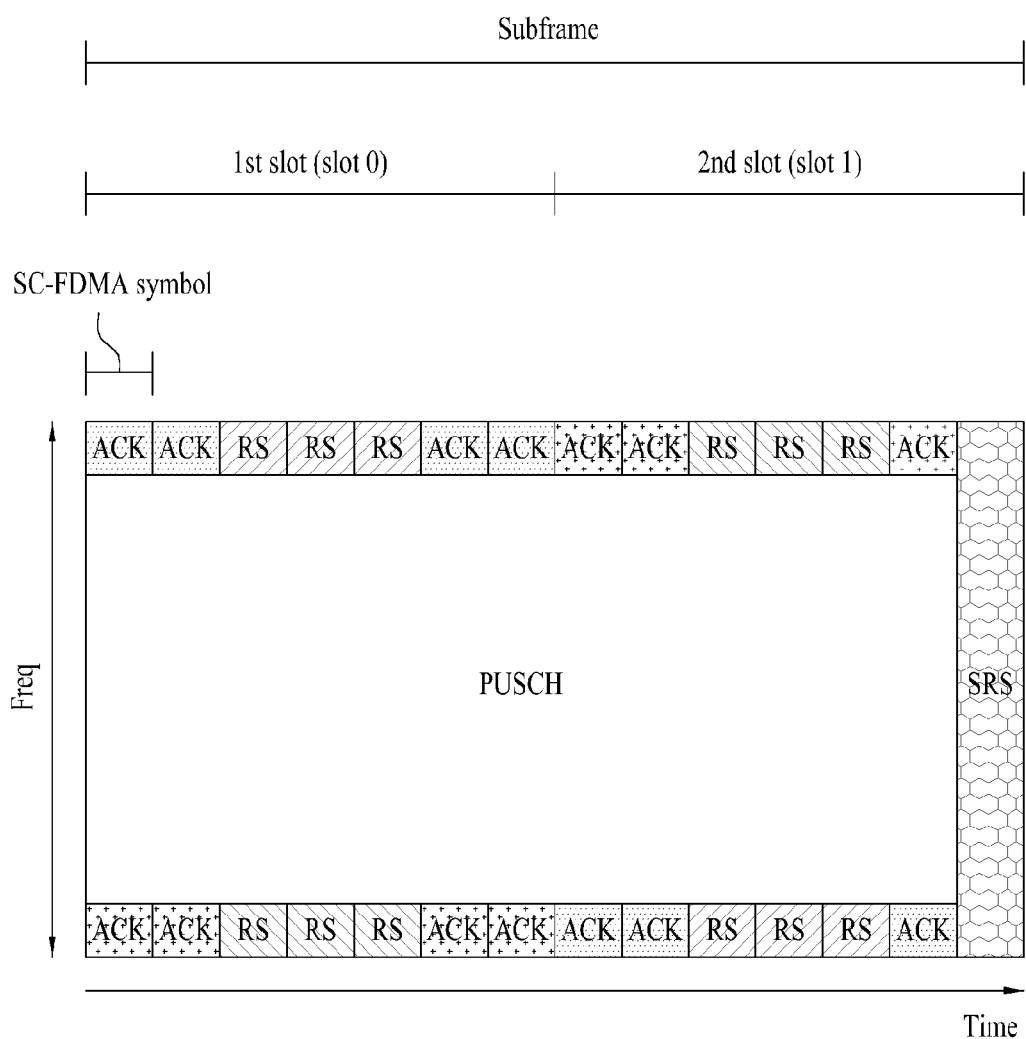
FIG. 12 is a diagram for describing a case that UL control information is transmitted in an SRS transmission configured subframe in case of a normal CP.

FIG. 12 is a diagram for describing a case that UL control information is transmitted in an SRS transmission configured subframe in case of a normal CP. Referring to FIG. 12, SRS may be transmitted on a last SC-FDMA symbol of a UL subframe in which a transmission of the SRS is configured. In this case, when PUCCH format 1a/1b is transmitted in the corresponding UL subframe, a last symbol of PUCCH in a $2^{nd}$ slot may not be transmitted. Hence, there exist 3 symbols, each of which carries an RS in a $2^{nd}$ slot of one UL subframe, irrespective of a presence or non-presence of the SRS transmission. Yet, the number of symbols, each of which carries ACK/NACK information, is 4 in case of not transmitting SRS but is decremented into 3 in case of transmitting SRS. Although FIG. 12 shows the example of the subframe structure in case of the normal CP, if the SRS is transmitted in a $2^{nd}$ slot of a subframe of an extended CP likewise, the number of symbols carrying ACK/NACK information is decremented to 3 from 4. Hence, a maximum spreading factor (SF) available for all of the two slots is 4 in a subframe having SRS not transmitted therein. Yet, SF in a $1^{st}$ slot and SF in a $2^{nd}$ slot become 4 and 3 in SRS subframe (e.g., a subframe for transmitting SRS, an SRS transmission configured subframe), respectively. Therefore, the number of maximum OCs (orthogonal covers or orthogonal spreading codes) available for each RB in the SRS subframe becomes 3 due to the restriction put on the $2^{nd}$ slot.

If SF is 4, it may be able to support maximum 4 different orthogonal spreading codes (OCs). Hence, maximum 4 UL control informations may be multiplexed and transmitted on the same time/frequency resource. Yet, when the UL control information and the SRS are configured to be transmitted in the same UL subframe, if SF is decremented to 3 (i.e., supportive of maximum 3 OCs), maximum 3 UL control informations may be multiplexed and transmitted on the same time/frequency resource (or using the same CS resource on the same time/frequency resource). In particular, a resource utilization rate is lowered due to the restriction of the SF despite using the same time/frequency resource.

According to the present invention, in order to raise PUCCH resource utilization rate, proposed is a method of supporting the same number of PUCCH resources in each of an SRS subframe (e.g., an SRS transmitting subframe, an SRS transmission configured subframe, etc.) and a normal subframe (e.g., a non-SRS subframe, etc.).

$1^{st}$ Embodiment

The present embodiment relates to a method of allocating different PUCCH resources to each user equipment in a normal subframe and an SRS subframe (or a $2^{nd}$ slot of the SRS subframe) by differently applying an SF for a PUCCH data part in the normal subframe and an SF for a PUCCH data part in the SRS subframe, respectively (e.g., by applying 'SF=4' for the PUCCH data part in the normal subframe and 'SF=3' for the PUCCH data part in the $2^{nd}$ slot of the SRS subframe). The $1^{st}$ embodiment of the present invention may apply to a case of performing PUCCH transmission by a channel selection scheme.

Figure 13:
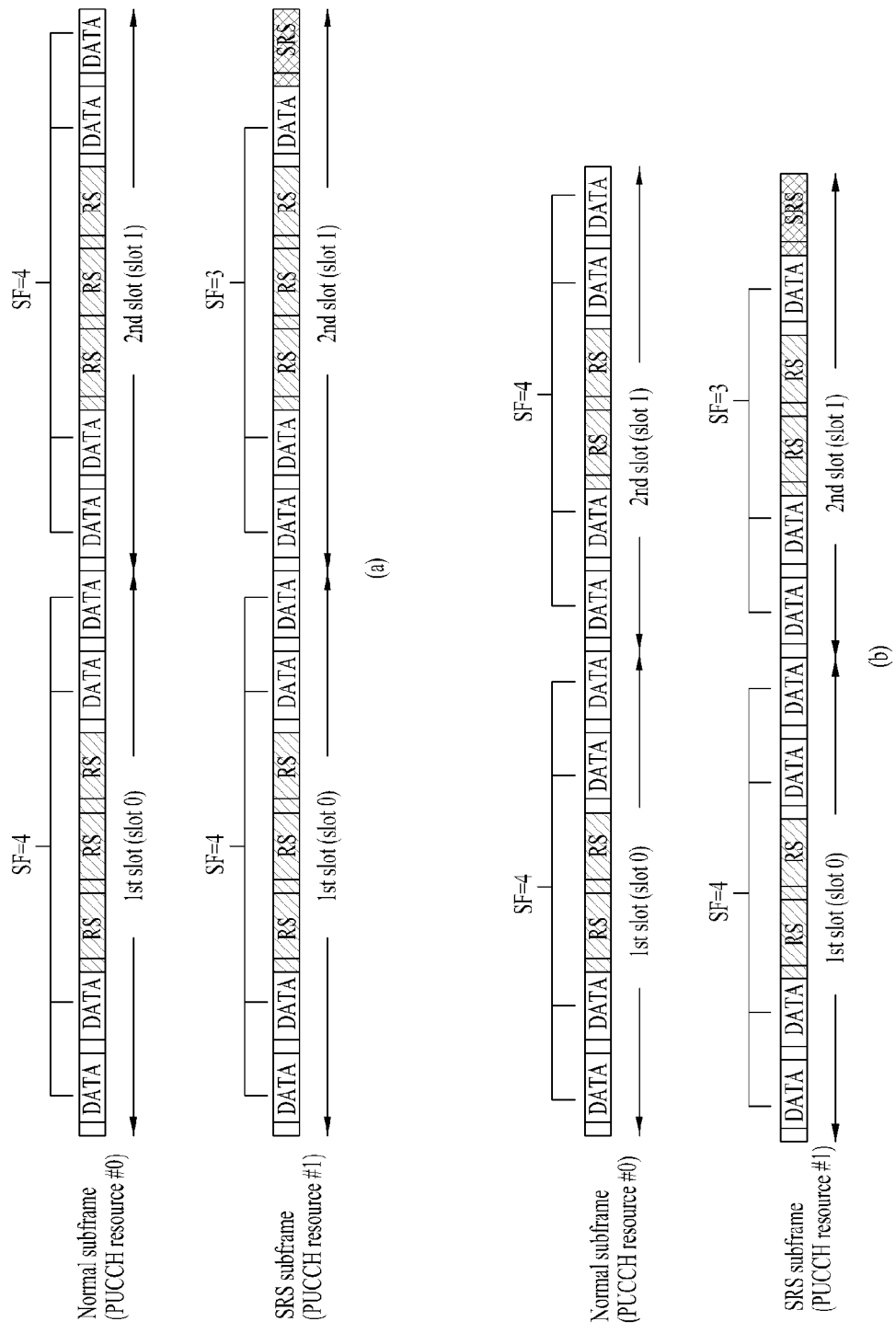
FIG. 13 is a diagram for one example of allocating different PUCCH resources for a normal subframe and an SRS subframe, respectively.

FIG. 13 is a diagram for one example of allocating different PUCCH resources for a normal subframe and an SRS subframe, respectively. FIG. 13 (*a*) shows one example for a case of a normal CP and FIG. 13 (*b*) shows one example for a case of an extended CP. Although ACK/NACK channel structure (i.e., PUCCH format 1/1a/1b structure) is exemplarily described with reference to FIG. 13, it is apparent that the same principle may be applicable to a random PUCCH channel structure of applying spreading by SC-FDMA symbol unit using orthogonal code (OC).

Referring to FIG. 13, OC of 'SF=4' may be applied for PUCCH data part in a normal subframe and OC of 'SF=3' may be applied for PUCCH data part in a $2^{nd}$ slot of an SRS subframe. In this case, PUCCH resource #1 is allocated for the SRS subframe, whereas PUCCH resource #0 is allocated for the normal subframe.

According to the present embodiment, since different SFs are applied to a normal subframe and an SRS subframe, respectively, a base station may be allocate different PUCCH resources in the normal subframe and the SRS subframe (or a $2^{nd}$ slot in the SRS subframe) to each user equipment, respectively. Examples of allocating a different PUCCH resource in accordance with a subframe type (e.g., SRS subframe, normal subframe (i.e., non-SRS subframe)) according to the present invention are described as follows.

PUCCH resource allocation may be performed in response to an indication of a PUCCH resource index (e.g., $n_{PUCCH}^{(1)}$ in case of PUCCH format 1 series, $n_{PUCCH}^{(2)}$ in case of PUCCH format 2 series, etc.). Like the following examples, a base station may be able to allocate different PUCCH resources for a normal subframe and an SRS subframe (or a $2^{nd}$ slot in the SRS subframe), respectively.

For instance, PUCCH resource index #0 may be allocated for a normal subframe and PUCCH resource index #1 may be allocated for an SRS subframe. If a PUCCH resource index value is different, a PUCCH resource indicated by the PUCCH resource index value may be determined differently. Since one PUCCH resource is specified by a combination of RB (i.e., time/frequency resource), OC and CS, a different PUCCH resource index may be able to indicate a different value for at least one of the RB, the OC and the CS. Accordingly, by indicating a PUCCH resource index differing in accordance with a subframe type, it may be able to allocate different PUCCH resources for a normal subframe and an SRS subframe (or a $2^{nd}$ slot in the SRS subframe), respectively.

For another instance, although the same PUCCH resource index is allocated to one user equipment for a normal subframe and an SRS subframe, a PUCCH resource having a corresponding PUCCH resource index linked with a normal subframe may be different from a PUCCH resource having a corresponding PUCCH resource index linked with an SRS subframe. In particular, a different PUCCH resource linkage may be configured in accordance with a subframe type for the same PUCCH resource index. Hence, by indicating the same PUCCH resource index despite a different subframe type and configuring a linkage between a PUCCH resource index and a PUCCH resource to be different in accordance with the subframe type, it may be able to allocate different PUCCH resources for a normal subframe and an SRS subframe (or a $2^{nd}$ slot in the SRS subframe), respectively.

$2^{nd}$ Embodiment

The present embodiment relates to a method of equalizing an SF of a PUCCH data part in a $2^{nd}$ slot of an SRS subframe to an SF of a PUCCH data part of a normal subframe and decreasing the number of RS transmission symbols in the $2^{nd}$ slot of the SRS subframe (i.e., decreasing an SF for an RS part), in performing a PUCCH transmission by a channel selection scheme. When a PUCCH transmission is performed in an SRS subframe by the related art method described with reference to FIG. 12, an SF for a PUCCH data (e.g., ACK/NACK information) in a $2^{nd}$ slot of the SRS subframe becomes 3. Yet, according to the present embodiment, an SF for PUCCH data may be maintained as 4 like a normal subframe. The $2^{nd}$ embodiment may be applicable in case of performing PUCCH transmission by a channel selection scheme.

Figure 14:
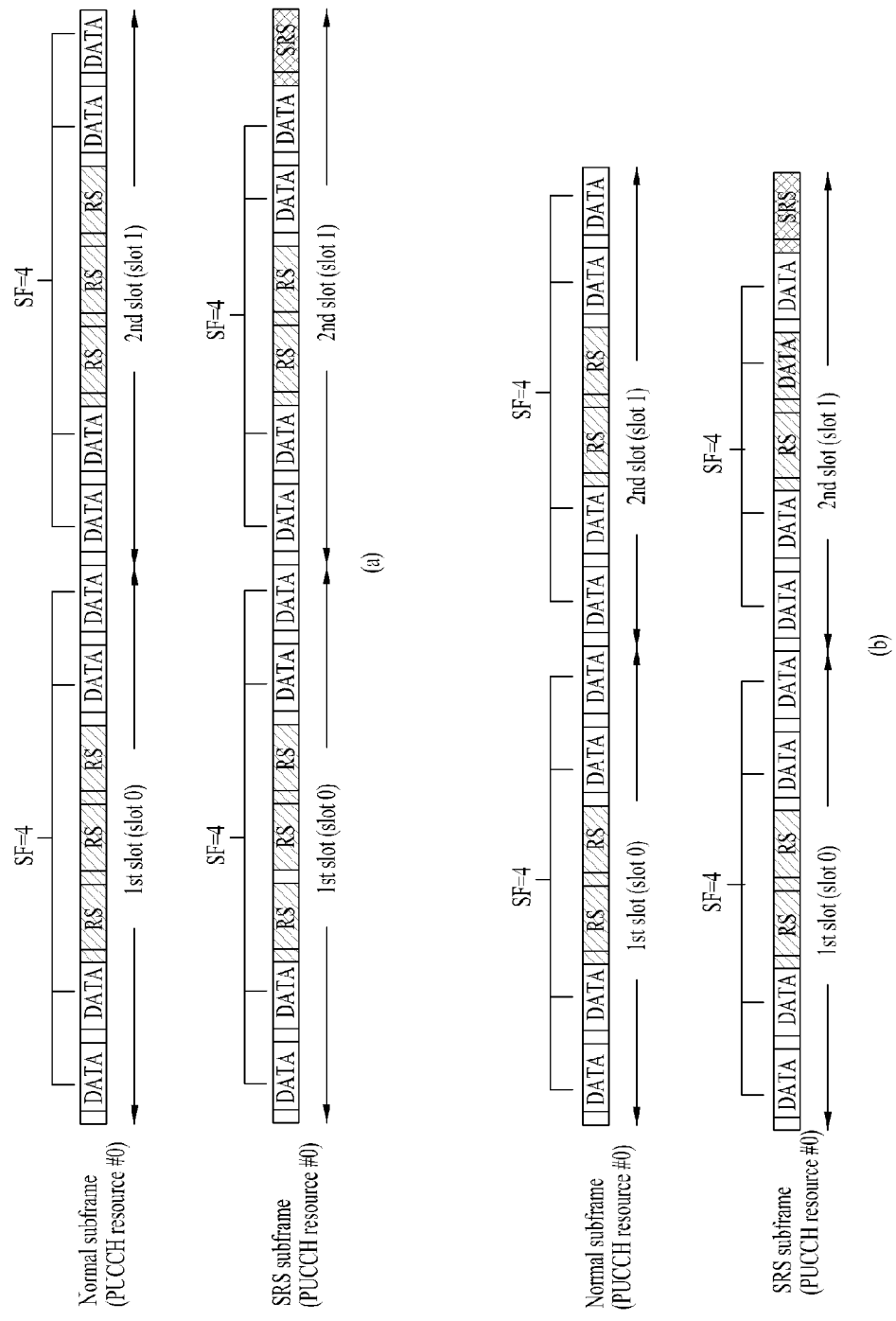
FIG. 14 is a diagram for one example of applying the same SF to a normal subframe and an SRS subframe.

FIG. 14 is a diagram for one example of maintaining the same SF of a normal subframe in an SRS subframe. FIG. 14 (*a*) shows one example for a case of a normal CP and FIG. 14 (*b*) shows one example for a case of an extended CP. Moreover, referring to FIG. 14, the same PUCCH resource (or PUCCH resource index) may be allocated for a normal subframe and an SRS subframe or different PUCCH resources (or PUCCH resource indexes) may be allocated for a normal subframe and an SRS subframe, respectively. Although ACK/NACK channel structure (i.e., PUCCH format 1/1a/1b structure) is exemplarily described with reference to FIG. 14, it is apparent that the same principle may be applicable to a random PUCCH channel structure of applying spreading by SC-FDMA symbol unit using orthogonal code (OC).

In a normal subframe shown in FIG. 14 (*a*), 3 symbols are used in one slot for an RS transmission but 2 symbols may be used only in a $2^{nd}$ slot of an SRS subframe for an RS transmission. Hence, referring to FIG. 14 (*a*), OC of 'SF=4' may be applied for a PUCCH data part in a normal subframe and OC of 'SF=4' may be applied for a PUCCH data part in a $2^{nd}$ slot of an SRS subframe as well.

In a normal subframe shown in FIG. 14 (*b*), 2 symbols are used in one slot for an RS transmission but 1 symbol may be used only in a $2^{nd}$ slot of an SRS subframe for an RS transmission. Hence, referring to FIG. 14 (*b*), OC of 'SF=4' may be applied for a PUCCH data part in a normal subframe and OC of 'SF=4' may be applied for a PUCCH data part in a $2^{nd}$ slot of an SRS subframe as well.

According to the present embodiment, since an SF for a PUCCH data part can be configured identical irrespective of a subframe type (e.g., an SRS subframe, a normal subframe (non-SRS subframe), etc.), it may be able to support the same number of PUCCH resources in all subframes.

The present embodiment may be especially useful for a case that a plurality of PUCCH resources are allocated to a single user equipment (e.g., a case of applying a channel selection scheme). According to the present embodiment, although an SF for a data part may be maintained identical in a normal subframe and an SRS subframe, since the number of symbols used for an RS transmission in a $2^{nd}$ slot of the SRS subframe decreases, the number of resources allocable for the RS transmission may decrease as well. In this case, in the conventional OUCCH channel structure, in order to multiplex UL control information from one user equipment and UL control information from another user equipment with each other on the same time/frequency resource, it may be advantageous for each of the user equipments to receive allocation of a discriminated RS resource. Yet, when one user equipment transmits UL control information using a plurality of PUCCH resources, if a different resource allocation is performed on a PUCCH data part (i.e., at least one of RB, OC and CS is differently allocated for the PUCCH data part), it is enough for the discrimination of each of the PUCCH resources. And, a base station may be then able to receive the UL control information by discriminating a plurality of the PUCCH resources from each other despite using the same RS resource. Even if one user equipment does not receive allocation of resources, of which number is equal to that of a PUCCH data part, for a PUCCH RS part, the corresponding user equipment has no difficulty in transmitting UL control information via a plurality of PUCCH resources. Therefore, the present embodiment may be usefully applicable.

$3^{rd}$ Embodiment

The present embodiments relates to a method of transmitting SRS in a UL subframe for transmitting PUCCH on performing a PUCCH transmission by a block spreading scheme. According to the present embodiment, when a PUCCH transmission is performed by a block spreading scheme, different PUCCH resources may be allocated to each user equipment in a normal subframe and an SRS subframe (or a $2^{nd}$ slot in the SRS subframe) by differently applying an SF for a PUCCH data part in the normal subframe and an SF for a PUCCH data part in the SRS subframe, respectively.

For instance, when a PUCCH transmission is performed by a block spreading scheme, it may be able to allocate different PUCCH resources to each user equipment in a normal subframe and an SRS subframe (or a $2^{nd}$ slot in the SRS subframe) by applying 'SF=3' on a time axis for a PUCCH data part in the normal subframe and 'SF=3' on the time axis for a PUCCH data part in the $2^{nd}$ slot of the SRS subframe (or, by applying 'SF=5' on a time axis for a PUCCH data part in the normal subframe and 'SF=4' on the time axis for a PUCCH data part in the $2^{nd}$ slot of the SRS subframe), respectively.

The aforementioned $1^{st}$ embodiment and the $3^{rd}$ embodiment are similar to each other in that an SF smaller than that for the normal subframe is applied for the $2^{nd}$ slot of the SRS subframe. The aforementioned $1^{st}$ embodiment relates to a method of differently allocating a PUCCH resource in accordance with a subframe type for a channel structure (i.e., a channel structure of multiplying a symbol by CASAC sequence, applying CS and then applying OC) in accordance with a conventional PUCCH format (e.g., PUCCH format 1/1a/1b). Meanwhile, the $3^{rd}$ embodiment relates to a method of allocating a PUCCH resource differently in accordance with a subframe type in case of applying a block spreading scheme (i.e., a structure of applying OC to a symbol sequence without applying CS thereto). Thus, the $3^{rd}$ embodiment differs from the aforementioned $1^{st}$ embodiment. In particular, the $3^{rd}$ embodiment may be regarded as corresponding to one example of applying the principle of the present invention mentioned in the foregoing description of the $1^{st}$ embodiment to the block spreading scheme.

Moreover, since different SFs are applied to a normal subframe and an SRS subframe, respectively, a base station may be able to allocate different PUCCH resources to each user equipment in the normal subframe and the SRS subframe (or a $2^{nd}$ slot in the SRS subframe).

For instance, different PUCCH resource indexes can be allocated for a normal subframe and an SRS subframe (or, a $2^{nd}$ slot of the SBS subframe), respectively. Alternatively, by indicating the same PUCCH resource index despite subframe types are different and by configuring a linkage between a PUCCH resource index and a PUCCH resource (i.e., a combination of RB, CS and OC) differently in accordance with a subframe type, it may be able to allocate different PUCCH resources for a normal subframe and an SRS subframe (or, a $2^{nd}$ slot of the SBS subframe), respectively.

Figure 15:
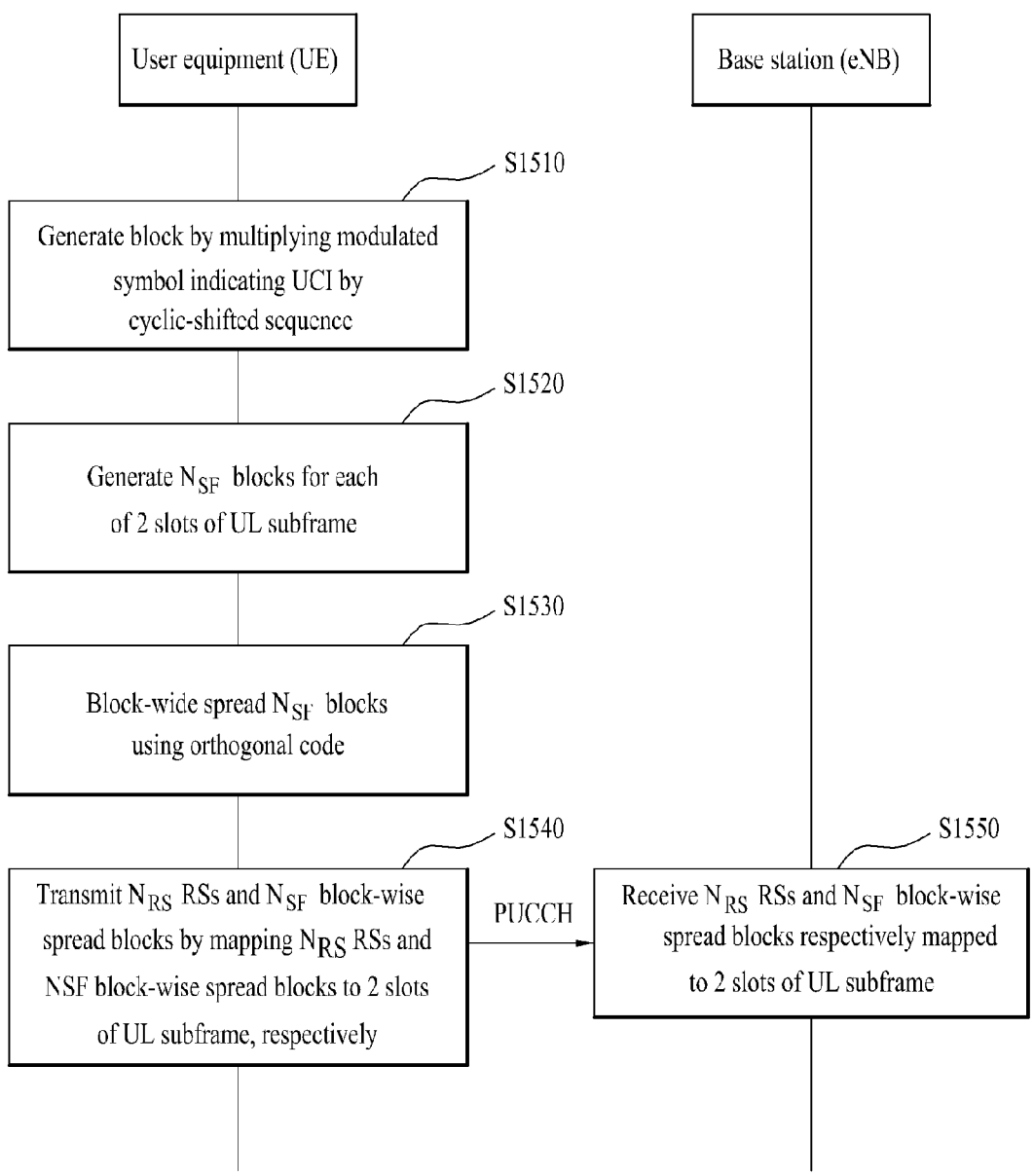
FIG. 15 is a flowchart for describing a UL control information transmitting method according to one embodiment of the present invention.

FIG. 15 is a flowchart for describing a UL control information transmitting method according to one embodiment of the present invention.

In the step S1510, a user equipment may be able to generate one block (i.e., a block of symbol) by multiplying a modulated symbol indicating UL control information (UCI) by a cyclic-shifted sequence. In this case, the modulated symbol indicating the UCI may correspond to a symbol that is modulated by applying a prescribed modulation scheme (e.g., BPSK, QPSK, etc.) to a bit in which HARQ ACK/NACK information on DL data is encoded for example. The cyclic-shifted sequence, by which the modulated symbol is multiplied, may correspond to a CAZAC sequence having a length 12 for example. The generated one block may be transmitted in a manner of being mapped to a prescribed number of subcarriers (e.g., 12 subcarriers) on one SC-FDMA symbol in a UL subframe.

In the step S1520, the user equipment may be able to generate $N_{SF}$ blocks supposed to be mapped to each of 2 slots of the UL subframe. In particular, $N_{SF}$ blocks to be mapped to SC-FDMA symbols within one slot are generated. Each of the blocks may be generated by multiplying the modulated symbol by a sequence cyclic-shifted in accordance with a different cyclic shift value. In this case, the number of the SC-FDMA symbols, to which the $N_{SF}$ blocks will be mapped, within one slot. And, the $N_{SF}$ may correspond to the spreading factor (SF) value mentioned in the foregoing description.

In the step S1530, the user equipment may be able to perform block-wide spreading on the $N_{SF}$ blocks within one slot using orthogonal code (OC). In particular, OC having a length $N_{SF}$ may be applied to the $N_{SF}$ blocks within one slot.

In the step S1540, the user equipment maps $N_{RS}$ reference signals (RSs) and $N_{SF}$ blocks to each of the two slots of the UL subframe and the transmits the mapped signals and blocks. In particular, the block-wide spread $N_{SF}$ blocks are mapped to the $N_{SF}$ SC-FDMA symbols among a prescribed number of SC-FDMA symbols configuring one slot and the $N_{RS}$ reference signals (RSs) may be mapped to the $N_{RS}$ SC-FDMA symbols, respectively. Positions for mapping the $N_{RS}$ RSs and positions of the block-wise spread $N_{SF}$ blocks may follow the definition for the conventional PUCCH format 1 series for example. For instance, in case that HARQ ACK/NACK is transmitted as UCI by the definition for the PUCCH format 1 series, the block-wide spread $N_{SF}$ blocks may be mapped to the $1^{st}$ two SC-FDMA symbols and the last two SC-FDMA symbols in one slot of a normal subframe in case of a normal CP and $N_{RS}$ RSs may be mapped to 3 SC-FDMA symbols in the middle of the one slot.

In the step S1550, a base station may be able to receive the UCI transmitted on PUCCH from the user equipment. The $N_{RS}$ RSs and the block-wide spread $N_{SF}$ blocks indicating the UCI are transmitted by being mapped to two slots of the UL subframe, respectively and the base station may be able to acquire the UCI and the RS in one UL subframe.

Before the step S1510, the user equipment may receive allocation of at least one PUCCH transmission resource from the base station. By the PUCCH transmission resource, time/frequency resource (e.g., RB), a cyclic shift (CS) value, an orthogonal code (OC) and the like may be determined to be used for the transmission of the UCI. So to speak, the PUCCH transmission resource may be specified by the combination of the RB, the CS and the OC. And, at least one of the RB, the CS and the OC may be differently allocated for a different PUCCH resource. Moreover, a plurality of PUCCH transmission resources are allocated to one user equipment and UCI may be then transmitted by a channel selection scheme. In particular, it may be able to transmit a plurality of UCIs by a combination of 'what kind of a prescribed resource is selected by the user equipment from a plurality of the PUCCH transmission resources' and 'a modulation value for the selected PUCCH transmission resource'.

In the aforementioned steps S1510 to S1540, the $N_{SF}$ (i.e., the number of blocks transmitted in one slot or the number of SC-FDMA symbols for mapping UCI in one slot) may be given differently to the case of configuring the transmission of the SRS in the $2^{nd}$ slot of the UL subframe or the case of not configuring the SRS transmission. For instance, in case of using PUCCH format 1 series, as mentioned in the foregoing description with reference to FIG. 13, if the SRS transmission is configured in both of the UL subframe of the normal CP and the UL subframe of the extended CP, $N_{SF}=3$. If the SRS transmission is not configured, $N_{SF}=4$. In this case, to the case of configuring the transmission of the SRS in the $2^{nd}$ slot of the UL subframe or the case of not configuring the SRS transmission, the $N_{RS}$ (i.e., the number of RS transmitted in one slot or the number of SC-FDMA symbols for mapping RS in one slot) may be identically given. For instance, in case of using PUCCH format 1 series, as mentioned in the foregoing description with reference to FIG. 13, it may be '$N_{RS}=3$' irrespective of a presence or non-presence of SRS transmission in the UL subframe of the normal CP. Moreover, it may be '$N_{RS}=2$' irrespective of a presence or non-presence of SRS transmission in the UL subframe of the extended CP. In this case, different PUCCH transmission resources may be allocated for the UL subframe having the SRS transmission configured therein and the UL subframe having the SRS transmission not configured therein, respectively. In particular, the allocation of the different PUCCH transmission resources may be performed by allocating different PUCCH resource indexes or by configuring a linkage of a PUCCH resource index and a PUCCH transmission resource differently in accordance with a subframe type in allocating the same PUCCH resource index.

Alternatively, in the aforementioned steps S1510 to S1540, the $N_{SF}$ (i.e., the number of blocks transmitted in one slot or the number of SC-FDMA symbols for mapping UCI in one slot) may be given identically to the case of configuring the transmission of the SRS in the $2^{nd}$ slot of the UL subframe or the case of not configuring the SRS transmission. For instance, in case of using PUCCH format 1 series, as mentioned in the foregoing description with reference to FIG. 14, it may be '$N_{SF}=4$' in both of the UL subframe of the normal CP and the UL subframe of the extended CP irrespective of a presence or non-presence of the SRS transmission. In this case, to the case of configuring the transmission of the SRS in the $2^{nd}$ slot of the UL subframe or the case of not configuring the SRS transmission, the $N_{RS}$ (i.e., the number of RS transmitted in one slot or the number of SC-FDMA symbols for mapping RS in one slot) may be differently given. For instance, in case of using PUCCH format 1 series, as mentioned in the foregoing description with reference to FIG. 14, if the SRS transmission is configured in the UL subframe of the normal CP, it may be '$N_{RS}=2$'. If the SRS transmission is not configured, it may be '$N_{RS}=3$'. If the SRS transmission is configured in the UL subframe of the external CP, it may be '$N_{RS}=1$'. If the SRS transmission is not configured, it may be '$N_{RS}=2$'.

Meanwhile, instead of the step S1510 and the step S1520 (i.e., not performing the step of generating a block by multiplying a modulated symbol by a cyclic-shifted sequence and the step of generating NSF blocks by differentiating a cyclic shift value), it may be able to apply a method of transmitting UCI in each of 2 slots of a UL subframe together with RS in a manner of applying block-spreading code without applying a cyclic shift to a symbol sequence having a prescribed length, as shown in FIG. 11. In this case, an SF on a time axis for a PUCCH data (UCI) part in a subframe having an SRS transmission not configured therein may be set to 5 [i.e., SF=5] and an SF on a time axis for a PUCCH data part in a $2^{nd}$ slot of a subframe having an SRS transmission configured therein may be set to 4 [i.e., SF=4]. In doing so, different PUCCH transmission resources may be allocated for the UL subframe having the SRS transmission configured therein and the UL subframe having the SRS transmission not configured therein, respectively. In particular, the allocation of the different PUCCH transmission resources may be performed by allocating different PUCCH resource indexes or by configuring a linkage of a PUCCH resource index and a PUCCH transmission resource differently in accordance with a subframe type in allocating the same PUCCH resource index.

In the extended UL control information transmitting method according to the present invention described with reference to FIG. 15, the matters of the various embodiments of the present invention mentioned in the foregoing description are independently applicable or at least two of the various embodiments of the present invention may be simultaneously applicable. And, duplicate contents may be omitted for clarity.

In the description of various embodiments of the present invention, a base station is mainly taken as an example of a DL transmission entity and a user equipment is mainly taken as an example of a UL transmission entity, by which the scope of the present invention may be non-limited. In case that a relay node becomes a transmission entity in downlink to a user equipment or a reception entity in uplink from a user equipment or that a relay node becomes a transmission entity in uplink to a base station or a reception entity in downlink from a base station, the principle of the present invention described through various embodiments of the present invention may be identically applicable.

Figure 16:
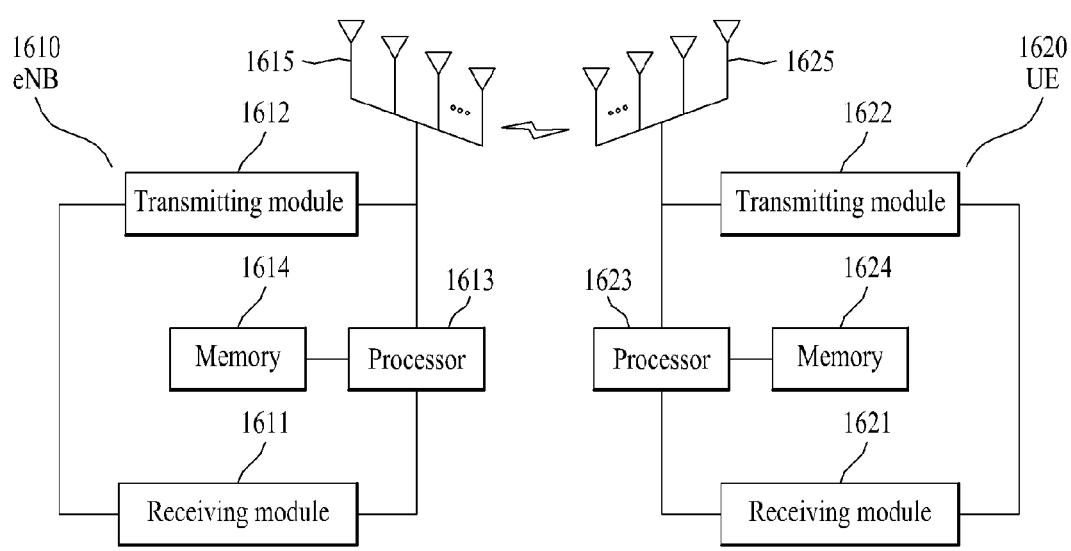
FIG. 16 is a diagram for configurations of a base station device and a user equipment device according to the present invention.

FIG. 16 is a diagram for configurations of a base station device and a user equipment device according to the present invention.

Referring to FIG. 16, a base station device (eNB) 1610 according to the present invention may include a receiving module 1611, a transmitting module 1612, a processor 1613, a memory 1614 and a plurality of antennas 1615. In this case, a plurality of the antennas 1615 may mean a base station device that supports MIMO transmission and reception. The receiving module 1611 may be able to receive various signals, data, information and the like in uplink from a user equipment. The transmitting module 1612 may be able to transmit various signals, data, information and the like in DL to the user equipment. Moreover, the processor 1613 may be configured to control overall operations of the base station device 1610.

The base station device 1610 according to one embodiment of the present invention may be configured to receive UL control information. The processor 1613 of the base station device 1610 may be configured to receive $N_{RS}$ RSs and $N_{SF}$ block-wide spread blocks, which are mapped to 2 slots of a UL subframe, respectively, from the user equipment 1620 via the receiving module 1611. In particular, the $N_{SF}$ block-wide spread blocks may be generated by the user equipment 1620 in a manner of generating one block by multiplying a modulated symbol indicating the UL control information by a cyclic-shifted sequence, generating $N_{SF}$ blocks for each of the 2 slots of the UL subframe, and then block-wise spreading the $N_{SF}$ blocks using orthogonal code. Moreover, the number $N_{SF}$ of the blocks transmitted in the $2^{nd}$ slot of the UL subframe may be identically given to the case of configuring an SRS transmission in the UL subframe and the case of not configuring the SRS transmission.

The processor 1613 of the base station device 1610 performs a function of operating information received by the user equipment device, information to be externally transmitted and the like. The memory 1614 may be able to store the operated information and the like for prescribed duration and may be substituted with such a component as a buffer (not shown in the drawing) and the like.

Referring to FIG. 16, a user equipment device (UE) 1620 according to the present invention may include a receiving module 1621, a transmitting module 1622, a processor 1623, a memory 1624 and a plurality of antennas 1625. In this case, a plurality of the antennas 1625 may mean a user equipment device that supports MIMO transmission and reception. The receiving module 1621 may be able to receive various signals, data, information and the like in downlink from the base station. The transmitting module 1622 may be able to transmit various signals, data, information and the like in UL to the base station. Moreover, the processor 1623 may be configured to control overall operations of the user equipment device 1620.

The user equipment device 1620 according to one embodiment of the present invention may be configured to transmit UL control information via PUCCH. The processor 1623 of the user equipment device 1620 may be configured to generate one block by multiplying a modulated symbol indicating the UL control information by a cyclic-shifted sequence and to generate $N_{SF}$ blocks for each of the 2 slots of the UL subframe. And, the processor 1623 may be configured to block-wise spread the $N_{SF}$ blocks using orthogonal code. Moreover, the processor 1623 may be configured to transmit the $N_{RS}$ RSs and the $N_{SF}$ block-wide spread blocks, which are mapped to 2 slots of a UL subframe, respectively, to the base station 1610 via the transmitting module 1622. In particular, the number $N_{SF}$ of the blocks transmitted in the $2^{nd}$ slot of the UL subframe may be identically given to the case of configuring an SRS transmission in the UL subframe and the case of not configuring the SRS transmission.

The processor 1623 of the user equipment device 1620 performs a function of operating information received by the user equipment device, information to be externally transmitted and the like. The memory 1624 may be able to store the operated information and the like for prescribed duration and may be substituted with such a component as a buffer (not shown in the drawing) and the like.

The detailed configurations of the base station device and the user equipment device mentioned in the above description may be implemented in a manner that the matters of the various embodiments of the present invention mentioned in the foregoing description are independently applicable or that at least two of the various embodiments of the present invention are simultaneously applicable. And, duplicate contents may be omitted for clarity.

In the description with reference to FIG. 16, the description of the base station device 1610 may be identically applicable to a relay device as a DL transmission entity or a UL reception entity. And, the description of the user equipment device 1620 may be identically applicable to a relay device as a DL reception entity or a UL transmission entity.

Embodiments of the present invention may be implemented using various means. For instance, embodiments of the present invention can be implemented using hardware, firmware, software and/or any combinations thereof.

In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known to the public.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. For instance, the respective configurations disclosed in the aforesaid embodiments of the present invention can be used by those skilled in the art in a manner of being combined with one another. Therefore, the present invention is non-limited by the embodiments disclosed herein but intends to give a broadest scope matching the principles and new features disclosed herein.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

INDUSTRIAL APPLICABILITY

The embodiments of the present invention mentioned in the foregoing description may be applicable to various kinds of mobile communication systems.

What is claimed is:

1. A method of transmitting uplink (UL) control information via a physical uplink control channel (PUCCH) by a user equipment in a wireless communication system, the method comprising:
generating one or more blocks for each of 2 slots of a UL subframe by multiplying a modulated symbol for the UL control information and a cyclic-shifted sequence;
block-wise spreading the blocks using an orthogonal code; and
mapping one or more reference signals (RSs) and the spread blocks to the 2 slots of the UL subframe, respectively, and transmitting the RSs and the spread blocks to a base station,
wherein a number of the blocks transmitted in a second slot among the 2 slots of the UL subframe has a same value for a case of configuring a transmission of sounding reference signal (SRS) in the UL subframe and a case of not configuring the transmission of the SRS.

2. The method of claim 1, wherein the UL control information comprises hybrid automatic repeat request (HARQ) acknowledgement/negative acknowledgement (ACK/NACK) information transmitted using PUCCH format 1, PUCCH format 1a or PUCCH format 1b, and
wherein the number of the blocks transmitted in the second slot of the UL subframe is set to 4 for each of the UL subframe of a normal cyclic prefix (CP) and the UL subframe of an extended cyclic prefix (CP).

3. The method of claim 1, wherein a number of the reference signals transmitted in the second slot of the UL subframe in the case of configuring the transmission of the SRS in the UL subframe is not equal to the number of the reference signals transmitted in the second slot of the UL subframe in the case of not configuring the transmission of the SRS.

4. The method of claim 1, wherein the UL control information comprises HARQ acknowledgement/negative acknowledgement (ACK/NACK) information transmitted using PUCCH format 1, PUCCH format 1a or PUCCH format 1b,
wherein a number of the reference signals transmitted in the second slot of the UL subframe is 2 in the case of configuring the transmission of the SRS in the UL subframe of a normal cyclic prefix (CP) and is 3 in the case of not configuring the transmission of the SRS, or
wherein the number of the reference signals transmitted in the second slot of the UL subframe is 1 in the case of configuring the transmission of the SRS in the UL subframe of an extended cyclic prefix (CP) and is 2 in the case of not configuring the transmission of the SRS.

5. The method of claim 1, wherein the sequence is cyclic-shifted in accordance with a different cyclic shift value for each of a plurality of SC-FDMA (single carrier frequency division multiple access) symbols of each of the 2 slots of the UL subframe for transmitting the UL control information.

6. The method of claim 1, wherein a plurality of PUCCH transmission resources are allocated to the user equipment and wherein at least one of a resource block (RB), an orthogonal code (OC) and a cyclic shift (CS) is differently allocated to each of a plurality of the PUCCH transmission resources.

7. A method of receiving uplink (UL) control information via a physical uplink control channel (PUCCH) by a base station in a wireless communication system, the method comprising:
receiving one or more reference signals (RSs) and block-wise spread blocks, which are mapped to 2 slots of a UL subframe, respectively, from a user equipment,
wherein the block-wise spread blocks are generated by the user equipment by multiplying a modulated symbol for the UL control information and a cyclic-shifted sequence, for each of the 2 slots of the UL subframe, and then block-wise spreading the blocks using an orthogonal code, and
wherein a number of the blocks transmitted in a second slot among the 2 slots of the UL subframe has a same value for a case of configuring a transmission of sounding reference signal (SRS) in the UL subframe and a case of not configuring the transmission of the SRS.

8. The method of claim 7, wherein the UL control information comprises hybrid automatic repeat request (HARQ) acknowledgement/negative acknowledgement (ACK/NACK) information transmitted using PUCCH format 1, PUCCH format 1a or PUCCH format 1b, and
wherein the number of the blocks transmitted in the second slot of the UL subframe is set to 4 for each of the UL subframe of a normal cyclic prefix (CP) and the UL subframe of an extended cyclic prefix (CP).

9. The method of claim 7, wherein a number of the reference signals transmitted in the second slot of the UL subframe in the case of configuring the transmission of the SRS in the UL subframe is not equal to the number of the reference signals transmitted in the second slot of the UL subframe in the case of not configuring the transmission of the SRS.

10. The method of claim 7, wherein the UL control information comprises HARQ acknowledgement/negative acknowledgement (ACK/NACK) information transmitted using PUCCH format 1, PUCCH format 1a or PUCCH format 1b, wherein a number of the reference signals transmitted in the second slot of the UL subframe is 2 in the case of configuring the transmission of the SRS in the UL subframe of a normal cyclic prefix (CP) and is 3 in the case of not configuring the transmission of the SRS, or wherein the number of the reference signals transmitted in the second slot of the UL subframe is 1 in the case of configuring the transmission of the SRS in the UL subframe of an extended cyclic prefix (CP) and is 2 in the case of not configuring the transmission of the SRS.

11. The method of claim 7, wherein the sequence is cyclic-shifted in accordance with a different cyclic shift value for each of a plurality of SC-FDMA (single carrier frequency division multiple access) symbols of each of the 2 slots of the UL subframe for transmitting the UL control information.

12. The method of claim 7, wherein a plurality of PUCCH transmission resources are allocated to the user equipment and wherein at least one of a resource block (RB), an orthogonal code (OC) and a cyclic shift (CS) is differently allocated to each of a plurality of the PUCCH transmission resources.

13. A user equipment, which transmits uplink (UL) control information via a physical uplink control channel (PUCCH) in a wireless communication system, the user equipment comprising:
a transmitting module configured to transmit an uplink (UL) signal to a base station;
a receiving module configured to receive a downlink (DL) signal from the base station; and
a processor configured to:
control the user equipment including the receiving module and the transmitting module,
generate one or more blocks for each of 2 slots of a UL subframe, by multiplying a modulated symbol for the UL control information and a cyclic-shifted sequence,
block-wise spread the blocks using an orthogonal code, and
map one or more reference signals (RSs) and the block-wise spread blocks to the 2 slots of the UL subframe, respectively, and transmit the RSs and the block-wise spread blocks to the base station via the transmitting module,
wherein a number of the blocks transmitted in a second slot among the 2 slots of the UL subframe has a same value for a case of configuring a transmission of sounding reference signal (SRS) in the UL subframe and a case of not configuring the transmission of the SRS.

14. A base station, which receives uplink (UL) control information via a physical uplink control channel (PUCCH) in a wireless communication system, the base station comprising:
a transmitting module configured to transmit a downlink signal to at least one user equipment;
a receiving module configured to receive an uplink signal from the at least one user equipment; and
a processor configured to:
control the base station including the receiving module and the transmitting module, and
receive one or more reference signals (RSs) and one or more block-wise spread blocks, which are mapped to 2 slots of a UL subframe, respectively, from the user equipment,
wherein the block-wise spread blocks are generated by the user equipment by multiplying a modulated symbol for the UL control information and a cyclic-shifted sequence, for each of the 2 slots of the UL subframe, and then block-wise spreading the blocks using an orthogonal code, and
wherein a number of the blocks transmitted in a second slot among the 2 slots of the UL subframe has a same value for a case of configuring a transmission of sounding reference signal (SRS) in the UL subframe and a case of not configuring the transmission of the SRS.

* * * * *